United States Patent [19]
Olofson et al.

[11] 3,905,981

[45] Sept. 16, 1975

[54] N-DEALKYLATION OF TERTIARY AMINES

[75] Inventors: Roy A. Olofson, State College, Pa.; Rodney C. Schnur, Palo Alto; Leonard A. Bunes, Redwood City, both of Calif.

[73] Assignee: Research Corporation, New York, N.Y.

[22] Filed: Oct. 12, 1973

[21] Appl. No.: 406,098

[52] U.S. Cl. ......... 260/285; 260/210 E; 260/239 B; 260/240 R; 260/243 R; 260/284; 260/285.5; 260/286 B; 260/286 Q; 260/287 E; 260/287; 260/288 CF; 260/289 C; 260/289 D; 260/291; 260/292; 260/293.51; 260/293.53; 260/293.62; 260/293.88; 260/326.15; 260/326.4; 260/326.8; 260/340.5; 260/559 AT; 260/563 C; 260/570.8 R; 260/570.9; 260/583 R

[51] Int. Cl.² ....................................... C07D 489/00

[58] Field of Search.......... 260/285, 210 E, 559 AT, 260/326.4, 583 R, 563 C, 570.9, 570.8 R, 293.51, 293.62, 291, 292

[56] References Cited
UNITED STATES PATENTS

| | | | |
|---|---|---|---|
| 3,299,072 | 1/1967 | Bartels-Keets | 260/285 |
| 3,324,170 | 6/1967 | Kollonetsch | 260/570.8 TC |
| 3,390,179 | 6/1968 | Hucker et al. | 260/570.8 TC |
| 3,493,657 | 2/1970 | Lewenstein et al. | 260/285 |

OTHER PUBLICATIONS

Flynn et al., Jour. Amer. Chem. Soc., Vol. 77; 1955, pp. 3104–3107.

*Primary Examiner*—Donald G. Daus
*Assistant Examiner*—Mary C. Vaughn
*Attorney, Agent, or Firm*—Holman & Stern

[57] ABSTRACT

A method for the N-dealkylation of tertiary amines which involves replacing an N-alkyl group of the tertiary amine with a vinyloxycarbonyl group by reaction with, for example, vinyl chloroformate to form a vinyloxycarbonyl amide, followed by cleavage with, for example, a mild acid to split off the vinyloxycarbonyl group and obtain the secondary amine. Such tertiary amines also containing alcoholic or phenolic hydroxyl groups can simultaneously be provided with hydroxyl group protection by formation of vinyloxycarbonyl ester groups which are stable under the mild acid cleavage conditions and which are removable with base or strong acid. The method has particular use in the syntheses of various tertiary amine compounds involving replacement of an alkyl group in a starting tertiary amine replacement of an alkyl group in a starting tertiary amine with another N-substituent.

18 Claims, No Drawings

N-DEALKYLATION OF TERTIARY AMINES

The invention described herein was made in the course of work under a grant or award from the Department of Health, Education and Welfare.

The invention relates to a novel process for the N-dealkylation of tertiary amines to give secondary amines, and particularly to the use of such process in the syntheses of various tertiary amine compounds involving replacement of an alkyl group in a starting tertiary amine with another N-substituent.

The N-dealkylation of tertiary amines is an important step in the syntheses of a large number of pharmaceuticals and other substances with biological activity such as pesticides, herbicides and the like. In many instances the starting material is a tertiary amine alkaloid available from natural sources, and the synthesis involves N-substituent modification requiring prior removal of an N-alkyl group to form the secondary amine. Most of the prior art methods for effecting N-dealkylation of tertiary amines involve reacting the tertiary amine with a reagent capable of replacing the N-alkyl group with a hydrolyzable group, followed by subsequent hydrolysis to the secondary amine. Among the reagents which have been proposed for this purpose are cyanogen bromide, ethyl chloroformate, benzyl chloroformate and phenyl chloroformate. For the most part, however, all of these reagents have been found to often produce relatively low yields of the desired dealkylated product and suffer from one or more of the disadvantages of requiring rather vigorous reaction conditions, being unsafe (e.g., several detonations and explosions have been reported during the use of cyanogen bromide as a synthetic reagent and the literature is replete with warnings concerning the dangers involved in its use), being nonselective as to the alkyl group removed from unsymmetrical tertiary amines, producing undesirable side reactions, and forming intractable product mixtures from which the desired dealkylated product is difficult to remove and purify.

In many of the syntheses referred to above, the starting material, in addition to having an amine function, also contains alcoholic and/or phenolic hydroxyl functions, as, for example, in the case of morphine and related structures. It is often necessary to block the hydroxyl groups in these compounds so as to protect them against attack during the dealkylation procedure. This is generally accomplished by a separate prior step of acylating the hydroxyl groups to convert them to ester groups which may subsequently be reconverted to hydroxyl groups by hydrolysis. It is often desirable to maintain the hydroxyl group protection even after the dealkylation procedure, particularly when the dealkylated amine group is to be subsequently modified by attachment of other substituents. Since esters are generally more easily cleaved than amides or cyanamides, maintenance of hydroxyl group protection during the hydrolysis step of the dealkylation procedure has not generally been feasible.

Accordingly, it is an object of the present invention to provide an improved method for the N-dealkylation of tertiary amines which, when compared with prior art methods, produces a higher yield of the desired N-alkylated product under milder reaction conditions.

Another object of the invention is to provide an improved method for the N-dealkylation of tertiary amines which is relatively free of undesirable side reactions and enables the desired N-dealkylated product to be readily recovered and purified.

A further object of the invention is to provide an improved method for the N-dealkylation of unsymmetrical tertiary amines which is highly selective as to the alkyl group removed from the tertiary amine.

A still further object of this invention is to provide a useful method for the blocking protection of alcoholic and/or phenolic hydroxyl groups during transformations at other reaction sites in neutral or mildly acidic media in which the protecting group may be cleanly removed in mild base or strong acid.

Still another object of the invention is to provide an improved method for the N-dealkylation of tertiary amines also containing alcoholic and/or phenolic hydroxyl groups which simultaneously provides blocking protection for the hydroxyl groups which is stable throughout the dealkylation procedure and is readily removable under conditions different from that prevailing during the dealkylation procedure.

A still further object of the invention is to provide a method for the N-dealkylation of tertiary amines by means of a reagent which is safe and inexpensive, particularly when compared with prior art materials, whereby the method is quite economical to carry out.

The foregoing and other objects are attained in accordance with the method of the present invention for effecting the mono N-dealkylation of tertiary amines containing at least one alkyl group attached to the amino N atom which involves replacing the N-alkyl group or one of the N-alkyl groups by a vinyloxycarbonyl group, which is hereinafter referred to as VOC and is represented in its simplest form by the formula

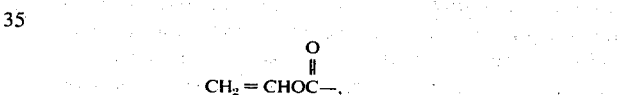

to thereby form the VOC-amide of a secondary amine, and thereafter cleaving the VOC-amide to split off the VOC group and obtain the corresponding free secondary amine or an acid salt thereof. The general reaction is diagrammed below, wherein X is a good leaving group:

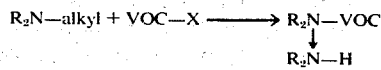

As discussed in more detail below, the alkyl group detached from the amino N atom may also be attached to one of the R groups in the starting tertiary amine, in which case such R group will be modified in the VOC-amide and the derived secondary amine.

The preferred reagent serving as a source of the VOC group in the reaction with the tertiary amine is vinyl chloroformate, having the formula

Vinyl chloroformate is a known compound readily synthesized in 40–45 percent yield by combining phosgene and ethylene glycol to give the bis-chloroformate of ethylene glycol which decomposes to vinyl chloroformate when passed through a hot tube. Details of the production of vinyl chloroformate can be found in U.S. Pat. No. 2,377,085 dated May 29, 1945 and in a paper by L. H. Lee (J. Org. Chem., 30, 3943 (1965)).

Although vinyl chloroformate is the preferred reagent to be used in the method of the present invention, other sources of the VOC group may be utilized according to the instant inventive concepts. For example, other vinyl haloformates and in general species, VOC-X, where X is a good leaving group may be utilized in place of vinyl chloroformate. In addition, the VOC group in such reagents may be a substituted VOC group as represented by the following general formula:

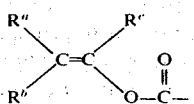

wherein $R^a$, $R^b$ and $R^c$ may be the same or different and may be H, alkyl, aryl, alkenyl, alkoxy, acyloxy, carboalkoxy, acyl, nitro or halogen. Further $R^a$ and $R^b$ or $R^a$ and $R^c$ may be joined in a ring (except that $R^a$ and $R^c$ may not be joined in a benzene or substituted benzene ring). Further substituents used as an aid in obtaining desired physical properties or chemical reactivity (e.g., $R^a$ might be para-nitrobenzyl or 3,5-dichlorophenyl) may serve as part of $R^a$, $R^b$ or $R^c$. Thus, the terms "vinyloxycarbonyl group" and "VOC group" as utilized throughout this specification and in the appended claims shall be understood to include substituted vinyloxycarbonyl groups in accordance with the above general formula. Moreover, while for the sake of simplicity the following discussion refers to the reagent in terms of the preferred material, vinyl chloroformate, it shall be understood that the discussion likewise applies to the use of other reagents encompassed by the general species, VOC—X, where VOC and X are as defined above, the only difference being that when reagents having substituted VOC groups are used in the N-dealkylation of tertiary amines and/or the protection of alcoholic or phenolic hydroxyl groups, the direct products will be the corresponding substituted VOC-amides and/or substituted VOC-esters, respectively.

The tertiary amines containing at least one alkyl group attached to the amino N atom which can be N-dealkylated by means of the process of the present invention encompass a large variety of compounds. The N-alkyl group to be detached from nitrogen may be methyl or primary, secondary, or tertiary alkyl. It may incorporate alkenyl or alkynyl functions anywhere except that the carbon attached to nitrogen may not also be part of a carbon-carbon double or triple bond. Moreover, this alkyl group may be further substituted by heteroaromatic (e.g., 2-, 3-, or 4-pyridyl, furanyl, thiophenyl) or aryl residues at any carbon including the carbon attached to the nitrogen (in which case it would be benzylic). Moreover, this alkyl group and such heteroaromatic and aryl residues which may be attached to it may be further substituted with a wide variety of substituents such as alkyl, aryl, halo, hydroxyl, alkoxy, acyloxy, acyl, carbalkoxy, quaternary ammonium, less reactive tertiary amino, nitro, and the like. Parts of this alkyl group may be further joined to one another as simple carbocyclic or polycyclic ring systems or may similarly be joined to another of the groups attached to the amino N atom to give rings including the amino N atom as part of the ring system. The two other groups attached to the amino N atom may be the same or different from the alkyl group split off from the starting tertiary amine and may be the same or different from one another. These two other groups may encompass all the structural variation permitted in the alkyl group split off plus the following. They may also be aryl or heteroaromatic groups or their further substituted analogues with the additional substituents the same as those allowed above. Moreover, these two other groups may be joined to one another to give rings including the amino N atom as part of the ring system. Said rings may also incorporate other heteroatoms such as oxygen. When aliphatic or aromatic hydroxyl groups are included as part of the tertiary amine structure, these may be converted to vinyloxycarbonyl esters during the treatment with vinyl chloroformate especially if a proton scavenger (see later) is included in the reaction medium. The free hydroxyl groups may later be regenerated by methods outlined below. Similarly any primary and secondary amino groups in the tertiary amine may be converted to their respective vinyloxycarbonyl amides during the treatment with vinyl chloroformate in the presence of a proton scavenger. The free amino groups will be regenerated from these amides during the splitting off of the VOC group which has replaced the N-alkyl residue of the starting tertiary amine.

Examples of specific tertiary amines to which the N-dealkylation process of the present invention is applicable include N,N-dimethyl-t-butylamine, N-methyldiisopropylamine, N,N-dimethylisopropylamine, N-methyldicyclohexylamine, N,N-dimethylcyclohexylamine, N,N-diethylcyclohexylamine, N,N-dimethylbenzylamine, hordenine, N,N-dimethyldopamine, N,N-dimethylmescaline, promazine, chlorpromazine, N-methylpyrrolidine, N-ethylpyrrolidine, 2-carbomethoxy-4-hydroxy-N-methylpyrrolidine, hygrine, nicotine, conessine, N-methylpiperidine, N-ethylpiperidine, arecoline, meperidine, apomorphine, lobeline, tropine, atropine, hyoscyamine, scopolamine, cocaine, tropacocaine, δ-coniceine, N-methylgranatonine, lupinine, sparteine, hydrastine, laudanosine, laudanine, narcotine, glaucine, boldine, morphothebaine, bulbocapnine, dauricine, cryptopine, chelidonine, emetine, cinchonine, quinine, lysergic acid methyl ester, yohimbine, reserpine, strychnine, β-erythroidine, morphine, codeine, $O^3,O^6$-diacetylmorphine, thebaine, 3-hydroxy-N-methylmorphinan, 3,14-dihydroxy-N-methylmorphinan, N-methyl-3-methoxymorphinan, 14-hydroxydihydrocodeinone, 14-hydroxydihydromorphinone, 5-methyldihydromorphinone, α-2′-hydroxy-2,5,9-trimethyl-6,7-benzomorphan, nalorphine, $O^3,O^6$-diacetylnalorphine, etorphine, 7,8-dihydro-7α-[1-hydroxy-1-methylethyl]$O^6$-methyl-6,14-endo-ethanomorphine, erythromycin, bufotenine, N,N-dimethyltryptamine, 4-hydroxy-N,N-dimethyltryptamine, tetracycline, tubocurarine, vinblastine, and the like.

The reaction between the tertiary amine and the vinyl chloroformate is generally carried out in a suitable inert solvent such as 1,2-dichloroethane, benzene, ether, methylene chloride, toluene, chloroform, tetrahydrofuran, sulfolane, and the like. When the N-dealkylation is especially facile (such as in some debenzylations), the reaction may even be performed in aqueous or alcoholic solvents provided a proton acceptor is also included in the reaction medium. Although the reactants may be mixed together at or near room temperature or at elevated temperatures, and the vinyl chloroformate may be added to the tertiary amine, the preferred procedure for mixing the reactants, particularly in those reactions where HCl is lost on removal of the alkyl group (such as in the splitting off of some tertiary and secondary alkyl groups), is to add the tertiary amine slowly to a stoichiometric excess of the vinyl chloroformate in the cooled reaction solvent. The generally preferred addition temperature is in the range of −40°C to 0°C, after which the mixture is allowed to warm to room temperature and then either left at room temperature for several hours or else heated for a shorter period. A short reflux period (e.g., 30 minutes to an hour in 1,2-dichloroethane, often longer in benzene or ether) is often advantageous to eliminate a volatile alkyl halide if such is produced on dealkylation or to guarantee completion of the reaction when the dealkylation has not previously been attempted and its rate is unknown. When the tertiary amine is very hindered (e.g., N-alkyldicyclohexylamines) or very weakly basic (e.g., N,N-dialkylanilines, N-alkylindolines), prolonged reflux, e.g., up to about 20 hours, or even high temperature procedures utilizing sealed tubes may be required.

When HCl or other acid is liberated during the N-dealkylation, a suitable proton scavenger is preferably included in the reaction mixture to remove the acid. The proton scavenger may itself be a tertiary amine provided such is more basic but less reactive toward vinyl chloroformate than the amine to be dealkylated. Proton scavengers of this type which have been discovered to be particularly useful include 1,8-bis-(dimethylamino)-naphthalene and N-alkyldicyclohexylamines such as N-methyldicyclohexylamine. The former can be recovered in essentially quantitative yield after treatment with vinyl chloroformate in 1,2-dichloroethane at reflux for 4 hours. The addition of such proton scavengers is also valuable when tertiary amines containing alcoholic or phenolic hydroxyl groups are N-dealkylated and it is desired to simultaneously react such hydroxyl groups with the vinyl chloroformate. In N-dealkylation of tertiary amines with vinyl chloroformate, the inclusion of small amounts of proton scavengers like 1,8-bis-(dimethylamino)-naphthalene in the reaction mixture to tie up traces of acid impurities (generated for example from trace moisture) is generally advantageous. If a stoichiometric amount of 1,8-bis-(dimethylamino)-naphthalene or a similar proton scavenger is included in the reaction medium for tertiary amine N-dealkylation with vinyl chloroformate, the tertiary amine hydrohalide or other acid salt may be used as the reactant without prior conversion to the free tertiary amine. This procedure is especially convenient when the tertiary amine to be N-dealkylated is most easily obtained or handled as some acid salt.

Reaction of vinyl chloroformate with a candidate tertiary amine having at least one alkyl group attached to the amino N atom, results in the removal of the N-alkyl group or one of the N-alkyl groups from the amino N atom of the tertiary amine, and replacement thereof by the VOC group. The resulting VOC-amide of a secondary amine is thereafter cleaved to remove therefrom the VOC group and obtain the corresponding free secondary amine or its hydrohalide or other acid salt. Such salts are often more conveniently handled than the free secondary amines and are readily neutralized when desired to give the free amines by well established methods. Several techniques are available for removal of the VOC group from the amino N atom. For example, the VOC group may be split off by titration of the VOC-amide with bromine in an inert solvent followed by the addition of a volatile alcohol such as methanol or ethanol (ROH) and removal of the solvent, excess alcohol, and the $BrCH_2CH(OR)_2$ at reduced pressure to produce the secondary amine hydrobromide. In another procedure the alcohol is present in solution with the VOC-amide as the bromine is added. Alternatively, the VOC group may be split off by treatment with 1.1 to 3 stoichiometric equivalents of an acid such as HCl or HBr in the presence of a hydroxylic reagent, such as water, a carboxylic acid or preferably an alcohol, which also often functions as the solvent. When other groups in a particular VOC-amide are sensitive to alcoholic acid, this cleavage may preferably be carried out as two separate steps. First, the VOC-amide is treated with HX (e.g., HCl or HBr) in an inert solvent such as an ether or chlorinated hydrocarbon. Then the intermediate,

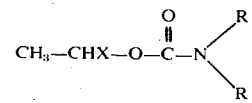

is freed from most excess acid and finally warmed with a volatile alcohol such as methanol or ethanol (ROH) yielding the secondary amine hydrohalide, $CO_2$, and $CH_3CH(OR)_2$. Solvent, byproducts, and excess reagents are easily removed by evaporation at reduced pressure. Moreover, the VOC group may be split off from the VOC-amide by mercuric ion induced hydrolysis with mercuric acetate in acetic acid.

The N-dealkylation method of the present invention has been found to produce yields of N-dealkylated product of up to about 90% and even higher and be relatively free of undesirable side reactions enabling the desired N-dealkylated product to be readily recovered and purified. Moreover, in the case of unsymmetrical tertiary amines, the method is highly selective as to the particular group removed from the amino N atom. Generally more than 98% of the total dealkylated product shows loss of the same moiety and only very rarely is the reaction less than 90% selective. Moreover, in those extremely rare examples where two different alkyl groups are normally lost to approximately the same extent, simple variations in reaction conditions (changes of solvent, concentration, or temperature, addition of salts) can be used to increase the proportion of whichever product is desired. Which group will be removed from any specific tertiary amine depends primarily on what groups are initially present. Loss of benzylic, allylic, and tertiary alkyl (e.g., t-butyl) groups occurs in preference to loss of methyl or primary or secondary alkyl groups. Methyl is lost in preference to longer chain primary alkyl groups (e.g., in hordenine). Loss of methyl or primary alkyl from N-methyl and N-primary alkyl piperidines and pyrrolidines occurs instead of heterocyclic ring scission even when a ring carbon attached to the N-atom is also formally a primary alkyl group. Many important alkaloid classes (e.g., morphines, tropanes, hygrines) fall within this category. The preference for removal of a benzyl group is strong enough, so that heterocyclic ring scission does occur when a ring carbon attached to the nitrogen is also an activated benzyl. Three of the examples which follow this discussion illustrate this mode of dealkylation. These are the reaction of vinyl chloroformate: (a) with glaucine to give 1-[N-VOC-N-methyl-2-aminoethyl]-3,4,6,7-tetramethoxyphenanthrene (Example 10), (b) with boldine to give 1-[N-VOC-N-methyl-2-aminoethyl]-3,7-di-O-VOC-4,6-dimethoxyphenanthrene (Example 14), and (c) with hydrastine to give the enol lactone below (Example 11).

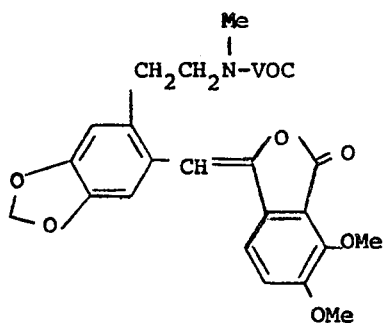

When the N-dealkylation competition is between secondary alkyl (e.g., cyclohexyl, isopropyl) and methyl or primary alkyl, the secondary alkyl group is preferentially removed unless the tertiary amine contains two methyl or primary alkyl groups. Then loss of these latter groups may also occur to a small extent or, when the secondary alkyl group is small in such systems (e.g., isopropyl itself), loss of methyl may even be favored.

In accordance with another aspect of the present invention, it has been found that if the tertiary amine also contains alcoholic or phenolic hydroxyl groups, treatment thereof with vinyl chloroformate and suitable proton scavengers not only forms VOC-amide groups at the amino N-atom, but also forms VOC-ester groups at the hydroxyl sites. Moreover, these VOC-ester groups were most surprisingly found to be stable under the mild acid cleaving conditions (e.g., alcoholic HBr at room temperature) employed for removal of the VOC groups from the amino N atom. On the other hand, the VOC-ester groups are readily removable and reconvertible to hydroxyl groups by treatment with aqueous or alcoholic base (e.g., sodium carbonate in warm aqueous dioxane) which is ineffective for removing the VOC-amide groups, or by treatment with strong aqueous or alcoholic acid (e.g., 2N aqueous HCl at reflux for several hours), which is also effective for removing the VOC-amide groups. This difference in acid-base reactivity and ease of acid-base removal between VOC-ester groups and VOC-amide groups makes it possible for the present N-dealkylation method to simultaneously provide hydroxyl group protection which is stable and effective not only throughout the N-dealkylation procedure but also during any subsequent modification of the dealkylated amine group by attachment of other tertiary amine forming substituents. Moreover, the extraordinary ease of converting the VOC-amide groups to secondary amine hydrohalides with mild acid even makes it possible to use the present N-dealkylation method in conjunction with the prior protection of alcoholic and phenolic hydroxyls with simple acyl groups (e.g., acetyl, benzoyl) and the retention of such protection throughout the N-dealkylation procedure.

The surprising and exceptional mild acid stability of VOC-esters means that the VOC group is especially suited to protect alcoholic and phenolic hydroxyls during reactions at other sites in a molecule involving neutral and acidic reagents or media. The process of the preceding paragraph, in which hydroxyl groups are protected as VOC-esters while a tertiary amine group in the same molecule is first converted to a VOC-amide which is subsequently converted with mild acid to a second amine hydrohalide which is neutralized yielding the free secondary amine which is alkylated to give a new tertiary amine, illustrates this concept. When hydroxyl groups are to be protected as VOC-esters with vinyl chloroformate while tertiary amino groups are simultaneously to be converted to VOC-amides, suitable proton scavengers such as 1,8-bis-(dimethylamino)-naphthalene or an N-alkyldicyclohexylamine are preferably included in the reaction mixture. Proton scavengers such as pyridine or hydroxide may conveniently be used to neutralize the liberated HCl when the compound containing hydroxyl groups to be protected as VOC-esters during subsequent reactions at other sites does not contain amino groups.

The method of the present invention has particular utility in syntheses involving replacement of N-alkyl groups such as N-methyl by other biological activity potentiating N-substituents in pharmaceutically important tertiary amine alkaloids and derivatives, as well as the N-substituent modification of even completely synthetic tertiary amine precursors to give valuable drugs. Some illustrations of this utility are given in the paragraphs which follow.

Many tropine ethers and esters (e.g., atropine or hyoscyamine) and their acid salts and their further substituted analogues (e.g., scopolamine, methscopolamine bromide or nitrate, cocaine) have important pharmaceutical activity as anticholinergics, antispasmodics, CNS depressants, motion sickness preventatives, mydriatics, sedatives, and local anaesthetics. These and similar compounds with the N-methyl replaced by other N-alkyls sometimes have increased or more selective pharmaceutical activity or reduced side effects. An example is ethybenztropine (N-ethyl-O-benzhydryl-nortropine) whose hydrochloride and hydrobromide salts are used as anticholinergics. The availability of a practical method for the N-demethylation of tropine and its analogues to the related nortropines would permit the latter to be useful intermediates in the preparation of such N-alkyl compounds. For example, an economical alternative to the usual multistep total synthesis of ethybenztropine is the route: tropine → nortropine → N-ethylnortropine → ethybenztropine, if a cheap procedure for converting tropine to nortropine were available. The conversion of nortropine (and its more easily isolated equivalent, nortropine hydrochloride) to ethybenztropine is already known. One application of the method of the present invention is a simple preparation of nortropine hydrochloride from tropine in an overall 77% pure yield (Example 5).

Other applications of the method of the present invention include a procedure for converting morphine to normorphine (Examples 17 and 18) and a method for converting 14-hydroxydihydrocodeinone to 14-hydroxydihydronorcodeinone (Example 25). Normorphine is the only known precursor of several N-alkylnormorphines with important analgesic and narcotic antagonist activity including N-ethylnormorphine and nalorphine (N-allylnormorphine), discussed in more detail below. Similarly, 14-hydroxydihydronorcodeinone is the key starting material in the preparation of N-alkyl derivatives with important analgesic and narcotic antagonist activity including N-cyclopropylmethyl-14-hydroxydihydronorcodeinone and its 6-carboxymethyloxime and 6-carboxymethyloxime methyl ester. The N-demethylation of the alkaloid, arecoline, to guvacoline hydrobromide in 90% overall yield has also been achieved (Example 3). N-Alkylguvacolines are often parasympathomimetics and anthelmintics. For example, the simplest such compound, N-methylguvacoline (arecoline itself), is used as a taenicide and is especially valuable in the treatment of Echinococcus granulosum infections in dogs.

Reference has been made above to the industrial production from morphine via normorphine of nalorphine, the principal drug now used in the emergency treatment of narcotic overdose victims. Nalorphine is one of several commercial or potentially commercial analgetics, antitussives, and narcotic antagonists with morphine-like structures which specifically contain an N-alkyl which is not N-methyl and a free phenolic hydroxyl group (also, often a free aliphatic hydroxyl). These compounds are presently made in the laboratory and commercially by unsatisfactory routes involving the replacement of N-methyls in tertiary amine precursors by the new N-alkyl group via the intermediate N-demethylated secondary amines. The hydroxyls are protected by acyl groups prior to the N-dealkylation step but this protection is lost during the dealkylation. This is unfortunate because side reactions in the subsequent alkylation step include O- and C-alkylation of the free phenol ring — side reactions which would have been avoided if the phenolic hydroxyl group had remained protected. Moreover, these secondary amines with free phenol groups (e.g., normorphine) are particularly unattractive candidates for later reactions. They are generally very high melting, very insoluble, very oxidation-sensitive substances.

In the synthesis of nalorphine, the alkaloid morphine is the starting material. In other examples the precursor may be an alkaloid transformation product; e.g., 14-hydroxy-7,8-dihydromorphinone (oxymorphone) which is made from thebaine or 7,8-dihydro-7α-(1-hydroxy-1-methylethyl)-O⁶-methyl-6,14-endoethanomorphine which is made from oripavine. Oxymorphone is used as the starting material in the preparation of N-allyl-14-hydroxy-7,8-dihydronormorphinone (naloxone) and N-cyclopropylmethyl-14-hydroxy-7,8-dihydronormorphinone while the ethanomorphine is the source of the related N-cyclopropylmethyl ethanonormorphine. The starting material may even be completely synthetic. For example, levallorphan ((−)-3-hydroxy-N-allylmorphinan) is made from levorphanol ((−)-3-hydroxy-N-methylmorphinan). Naloxone and levallorphan are now sold as narcotic antagonists. Naloxone and the two N-cyclopropylmethyl compounds above also show great promise as nonaddictive substitutes for methadone in long term heroin addict thereapy.

All of the above-discussed commercially important compounds, i.e., nalorphine, naloxone, levallorphan and the two N-cyclopropylmethyl compounds, may be synthesized from the appropriate precursor tertiary amine, employing the vinyl chloroformate N-dealkylation O-protection method of the present invention. For example, one reaction sequence for the synthesis of nalorphine from morphine (Example 21) comprises treating morphine with vinyl chloroformate in the presence of a proton scavenger to obtain N,O,O-triVOC-normorphine, mild acid treatment to effect removal of the N-VOC group and obtain the acid salt of O,O-diVOC-normorphine, which is neutralized and N-allylated with allyl bromide to obtain O,O-diVOC-nalorphine, and finally base or strong acid treatment to effect removal of the O-VOC groups and obtain nalorphine. The reaction sequence is diagrammed below.

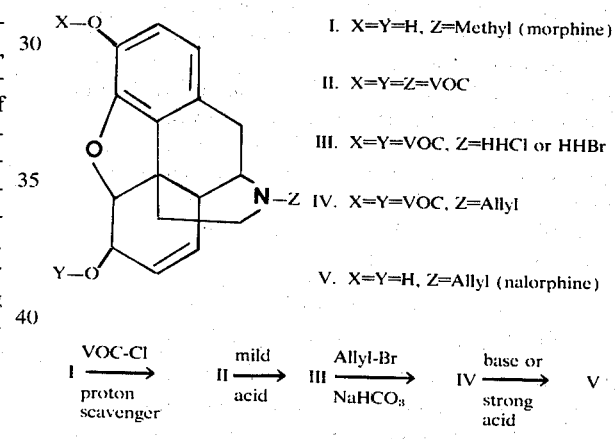

I. X=Y=H, Z=Methyl (morphine)

II. X=Y=Z=VOC

III. X=Y=VOC, Z=HHCl or HHBr

IV. X=Y=VOC, Z=Allyl

V. X=Y=H, Z=Allyl (nalorphine)

$$I \xrightarrow[\text{proton scavenger}]{\text{VOC-Cl}} II \xrightarrow{\text{mild acid}} III \xrightarrow[\text{NaHCO}_3]{\text{Allyl-Br}} IV \xrightarrow[\text{strong acid}]{\text{base or}} V$$

The overall yield in this sequence in which normorphine is not an intermediate is 76%. This is over a third more than the maximum reported yield of less pure material using a cyanogen bromide N-demethylation with normorphine as an intermediate.

In another variation of the N-dealkylation method of the present invention (Examples 22 and 23), nalorphine may also be made by a route in which morphine is first acetylated to give O,O-diacetylmorphine which is then treated with vinyl chloroformate to obtain N-VOC-O,O-diacetylnormorphine, which is reacted first with HCl gas and then hot methanol to give O,O-diacetylnormorphine hydrochloride which is finally neutralized, allylated with allyl bromide and hydrolized to nalorphine. The overall yield for the sequence, O,O-diacetylmorphine to O,O-diacetylnormorphine hydrochloride is an excellent 88%.

The application of the method of the present invention to the synthesis of naloxone from oxymorphone (Example 26) is illustrated by the reaction sequence diagrammed below:

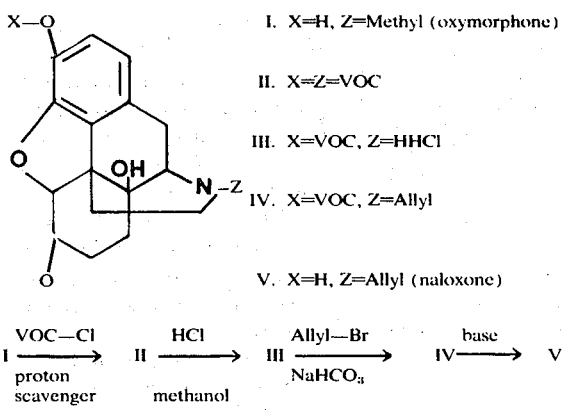

I. X=H, Z=Methyl (oxymorphone)

II. X=Z=VOC

III. X=VOC, Z=HHCl

IV. X=VOC, Z=Allyl

V. X=H, Z=Allyl (naloxone)

$$\text{I} \xrightarrow[\text{proton scavenger}]{\text{VOC—Cl}} \text{II} \xrightarrow[\text{methanol}]{\text{HCl}} \text{III} \xrightarrow[\text{NaHCO}_3]{\text{Allyl—Br}} \text{IV} \xrightarrow{\text{base}} \text{V}$$

In this sequence it proved convenient not to protect the hindered tertiary aliphatic hydroxyl group. If such protection is ever desired, more vigorous reaction conditions may be used.

As another illustration of the utility of the O-protection N-dealkylation method of the present invention, the readily available alkaloid, hordenine (N,N-dimethyltyramine) has been converted in 87% yield to N-methyltyramine hydrochloride (Example 16). This example also demonstrates the selectivity of VOC introduction and removal by the isolation in separate clean reactions of O-VOC-hordenine, O-VOC-N-methyltyramine, N-VOC-N-methyltyramine, and O,N-diVOC-N-methyltyramine. These reactions were mostly performed as models for analogous transformations in more highly hydroxylated phenylethylamine systems (e.g., dopamine, adrenalin). However, it is noteworthy that tyramine and some of its N-alkyl derivatives including the N,N-dimethyl compound have sympathomimetic activity.

The following examples are given as illustrative of the instant inventive concepts:

EXAMPLE 1

N-Deethylation of N-Ethylpiperidine

A 250 ml three neck flask containing 50 ml of 1,2-dichloroethane and a teflon stirring bar was fitted with: (1) a 25 ml pressure equalizing dropping funnel containing N-ethylpiperidine (5.65 g, 50 mmole) in 10 ml of dichloroethane and (2) a condenser topped by a gas inlet. The apparatus was flushed with $N_2$ and thereafter maintained under a slight positive $N_2$ pressure. Vinyl chloroformate (65 mmole) was syringed into the reaction vessel which was then cooled to −35°C (Dry Ice-dichloroethane bath). The amine was added (10 min) to the rapidly stirred solution. As each drop hit the surface, heat was generated and a white solid immediately precipitated. After the addition the mixture was allowed to warm to room temperature. During this 40 minute period the solid dissolved. Finally the reaction mixture was refluxed for 30 minutes, then cooled, and concentrated at reduced pressure. The residual orange oil, dissolved in 60 ml of ether, was extracted with 25 ml of 5% pH 4 sodium citrate buffer and 25 ml of 5% $NaHCO_3$, dried ($Na_2SO_4$), and vacuum distilled. The N-VOC-piperidine was obtained as a colorless, sweet-smelling, slightly viscous liquid of bp 60°–61°C at 0.3 torr; yield 6.93 g (90%).

Calculated for $C_8H_{13}NO_2$: C, 61.91%; H, 8.44%; N, 9.03%.

Found: C, 62.18%; H, 8.07%; N, 9.28%.

The yield of pure distilled product was the same in an inverse addition experiment in which the vinyl chloroformate was dripped into the cold amine solution and in an experiment in which the reflux step was left out but the reaction mixture was kept at room temperature for 4 hours prior to work-up. Isolated product yields greater than 80% were also obtained in analogous experiments performed in methylene chloride, benzene, ether, and mixtures of these solvents. The reaction also proceeded in high yield in sulfolane but the N-VOC-piperidine was not easily separated from this solvent.

A solution of N-VOC-piperidine (1.55 g, 10 mmole) in 10 ml of $CCl_4$ was titrated with bromine (1.60 g, 10 mmole) in the same solvent to the orange-brown end point. Then 20 ml of methanol was added and the mixture allowed to stand for one hour prior to vacuum evaporation. The solid residue was dissolved in ethanol and precipitated with hexane to give piperidine hydrobromide as white feathers; mp 235°–236°C; yield 1.62 g (98%). In another experiment the crude, unstable bromine addition intermediate, $BrCH_2CHBrOCON(CH_2)_5$, was isolated (strong infrared absorption at 5.77 microns in $CCl_4$) in 97% yield by vacuum evaporation of the $CCl_4$.

Removal of the VOC unit in N-VOC-piperidine was also performed by hydrolysis with excess 2N anhydrous HBr in methanol at room temperature. By this procedure piperidine hydrobromide was obtained in 98% yield. N-VOC-piperidine (1.55 g, 10 mmole) could also be converted to piperidine by reaction with mercuric acetate (1.6 g, 5 mmole) in 10 ml of 9:1 acetic acid-water at room temperature.

For purposes of comparison the first N-ethylpiperidine dealkylation experiment above was repeated, substituting ethyl chloroformate, benzyl chloroformate, and phenyl chloroformate for the vinyl chloroformate. With ethyl chloroformate, the yield of crude N-ethoxycarbonylpiperidine was only 10%. This yield was not increased by prolonging the reaction time. In the primary reaction path, the N-ethylpiperidine is just a catalyst for the decomposition of ethyl chloroformate to ethyl chloride and carbon dioxide. With benzyl chloroformate, this alternate process was even more significant. The only nonionic neutral products found were benzyl chloride and carbon dioxide. With phenyl chloroformate, the yield of N-phenoxycarbonylpiperidine (mp 78°–79°C) was only 34%. This last reagent has the further disadvantage in that it is not as volatile as vinyl chloroformate and the excess cannot readily be removed by evaporation of the reaction mixture. The excess phenyl chloroformate also largely survives the mild extraction work-up outlined above. To remove it and the phenol hydrolysis product, a tedious fractional vacuum distillation-sublimation was required. Hence, it can be seen that in this stringent test N-deethylation with vinyl chloroformate produces substantially higher yields than those obtained with any of these prior art dealkylating agents.

The N-ethylpiperidine system also provides an excellent example of the enormous selectivity advantage of vinyl chloroformate over cyanogen bromide as a dealkylating agent. J. von Braun has reported (Chem. Ber., 42, 2035 (1909) that reaction of N-ethylpiperidine with cyanogen bromide gives an intractable mixture of N-cyanopiperidine (est. yield 50%), the ring-opened ε-bromopentylethylcyanamide (est. 28%) and N-ethylpiperidine hydrobromide (est. 18%). The direct yield reducing disadvantage of non-selectivity is compounded by the further problems introduced when functionally similar products must be separated. No ring-opened product was found in the vinyl chloroformate reaction.

EXAMPLE 2

N-Demethylation of N-Methylpiperidine

Demethylation of N-methylpiperidine (4.96 g, 50 mmole) with vinyl chloroformate (65 mmole) was accomplished by the initial procedure outlined in Example 1. A 91% yield (7.00 g) of N-VOC-piperidine was obtained by vacuum distillation. No ring-opened product was obtained. The isolated product yields from analogous experiments in ether and toluene were 91% and 84%, respectively.

EXAMPLE 3

N-Demethylation of Arecoline with Vinyl Chloroformate

Freshly distilled arecoline (3.92 g, 25.3 mmole) in 7 ml of 1,2-dichloroethane was added dropwise (15 min) to a rapidly stirred solution of vinyl chloroformate (28 mmole) in 20 ml of dichloroethane maintained at −35°C. The solid containing mixture became homogeneous when allowed to warm to room temperature. To guarantee completion of the dealkylation, the solution was then refluxed for 30 minutes. The dichloroethane and excess vinyl chloroformate were removed by evaporation at reduced pressure and the residue was taken up in 75 ml of ether. The ether solution was washed with 5% citrate buffer (pH 4) and 5% bicarbonate, dried ($Na_2SO_4$), and concentrated in vacuo (4.89 g, 92%, spectroscopically pure). Vacuum distillation yielded analytically pure N-VOC-guvacoline; 4.22 g (86%); bp 132°C at 0.8 torr (104°–106°C at 0.2 torr).

Calculated for $C_{10}H_{13}NO_4$: C, 56.86%; H, 6.20%; N, 6.63%.

Found: C, 56.93%; H, 6.31%; N, 6.87%.

A solution of N-VOC-guvacoline (434 mg, 2 mmole) and 10% anhydrous methanolic HBr (3.3 g, 4.1 mmole of HBr) in 10 ml of methylene chlorine was left at room temperature for 12 hours. The crystalline product obtained after evaporation in vacuo, guvacoline hydrobromide, was triturated with ethyl acetate and filtered; yield 450 mg (98%), mp 140°–141°C. Recrystallization from acetone raised the mp to 142°–142.5°C.

Demethylation of arecoline hydrobromide could be accomplished without conversion to free arecoline in a separate prior step if a poorly nucleophilic proton scavenger more basic than arecoline was included in the reaction medium. The use of N-methyldicyclohexylamine for this purpose is detailed in the procedure which follows: N-Methyldicyclohexylamine (9.75 g, 50 mmole) in 10 ml of 1,2-dichloroethane was added (15 min) to a mixture of arecoline hydrobromide (11.8 g, 50 mmole) and vinyl chloroformate (70 mmole) in 50 ml of 1,2-dichloroethane kept at −35°C. The reaction mixture was then brought to reflux and worked up as above to give 7.37 g (70%) of distilled N-VOC-guvacoline. Analysis by vpc (5 feet × ¼ inch 20% SE-30 on Gas Chrom W column, temp = 180°C, flow rate = 150 ml/min, retention time = 9.5 min) demonstrated that no N-VOC-N-methylcyclohexylamine (retention time of sample = 3.2 min) was present in the distillation fraction.

EXAMPLE 4

N-Demethylation of Arecoline with Isopropenyl Chloroformate

Isopropenyl chloroformate (bp 75°C) (1.8 g) in 3 ml of $CH_2Cl_2$ was added dropwise to a stirred solution of arecoline (1.29 g) in 10 ml of 1,2-dichloroethane maintained at −35°C. The mixture was warmed to room temperature, then refluxed for 30 minutes, and concentrated in vacuo. The residue was partitioned between 35 ml of ether and 5 ml of 5% pH 4 citrate buffer, the two phases separated, and the ether layer washed with aqueous bicarbonate, dried ($Na_2SO_4$), and distilled to give 1.32 g (70%) of pure N-isopropenyloxycarbonylguvacoline; bp 124°C at 0.3 torr.

Calculated for $C_{11}H_{15}NO_4$: C, 58.66%; H, 6.71%; N, 6.22%.

Found: C, 58.87%; H, 6.48; N, 6.39%.

The N-isopropenyloxycarbonylguvacoline was hydrolyzed to guvacoline hydrobromide (mp 141°–142.5°C) with 2-fold excess of 5% anhydrous methanolic HBr at room temperature.

In another experiment N-methylpiperidine was dealkylated to give N-isopropenyloxycarbonylpiperidine (bp 47°C at 0.2 torr) in 88% yield by the procedure of Example 2 with isopropenyl chloroformate in place of the vinyl chloroformate.

EXAMPLE 5

N-Demethylation of Tropine

Tropine (2.82 g, 20 mmole) and vinyl chloroformate (45 mmole) in 50 ml of 1,2-dichloroethane were reacted using the first procedure described in Example 3 for the demethylation of arecoline. An oil, whose infrared spectrum was nearly identical to that of N-VOC-nortropine (see below) was obtained after the acid and base extraction and ether evaporation. This material (3.57 g, maximum yield 90%) was dissolved without further purification in 20 ml of a 5% solution of HCl gas in methanol, the mixture refluxed for three hours, and then evaporated at reduced pressure. The white solid residue was recrystallized from ethanol/ethyl acetate to give nortropine hydrochloride in 77% overall yield (2.50 g); mp 285°–287°C dec.

The intermediate, N-VOC-nortropine, was isolated pure by the following procedure. Vinyl chloroformate (18 mmole) in ether (5 ml) was added to a stirred solution of tropine (2.5 g, 18 mmole) in ether (40 ml) kept at room temperature. The mixture was refluxed overnight, cooled, and washed with two 10 ml portions of 5% $Na_2CO_3$. The aqueous phase was back extracted with ether and the combined either extracts were dried ($Na_2SO_4$) and concentrated. The residual oil was chromatographed on silica using ethyl acetate as the eluant. The product was obtained analytically pure as a light yellow viscous oil (yield 2.65 g, 76%) after prolonged pumping in vacuo of the main chromatography fraction.

Calculated for $C_{10}H_{15}NO_3$: C, 60.90%; H, 7.67%; N, 7.10%.

Found: C, 60.62%; H, 7.67%; N, 6.91%.

EXAMPLE 6

N-Debenzylation of N,N-Demethylbenzylamine

N,N-Dimethylbenzylamine (6.75 g, 50 mmole) was treated with vinyl chloroformate (65 mmole) using the initial procedure of Example 1. No demethylation products were obtained. The products found were benzyl chloride and VOC-NMe$_2$ (84%); bp 56°–56.5°C at 14 torr.

Calculated for C$_5$H$_9$NO$_2$: C, 52.16%; H, 7.88%; N, 12.17%.

Found: C, 52.16%, H, 8.14%; N, 12.38%.

The VOC-NMe$_2$ was quantitatively converted to dimethylamine hydrobromide by titration of a solution in CH$_2$Cl$_2$ with Br$_2$ in CCl$_4$ to an end point where the orange bromine color persisted for a minute followed by addition of several ml of methanol to the solution. The product salt was obtained in pure form as the residue from vacuum evaporation of the reaction solution. In another experiment the unstable intermediate adduct, Me$_2$NCO$_2$CHBrCH$_2$Br (strong infrared absorption of 5.80 microns, film), was isolated by evaporation prior to methanol addition.

EXAMPLE 7

N-De-t-butylation of N,N-Dimethyl-t-butylamine

Reaction of N,N-dimethyl-t-butylamine (5.05 g, 50 mmole) with vinyl chloroformate (65 mmole) by the method used in Example 6 also yielded VOC-NMe$_2$ but this was contaminated by ca. 5% of MeCHClOCONMe$_2$ (strong infrared absorption at 5.79 microns in CCl$_4$), the product formed by addition of the HCl liberated in this dealkylation to the VOC-NMe$_2$. Since MeCHClOCONMe$_2$ is the intermediate in the further hydrolysis with HCl, its presence is not a disadvantage. The total neutral fraction was just hydrolyzed in 97% yield to dimethylamine hydrochloride with anhydrous HCl in ethanol at room temperature. Treatment of pure VOC-NMe$_2$ with HCl under similar conditions also yielded dimethylamine hydrochloride in nearly quantitative yield. A sample of MeCHClOCONMe$_2$ was made by bubbling anhydrous HCl through a solution of VOC-NMe$_2$ in 1,2-dichloroethane.

The formation of any MeCHClOCONMe$_2$ could be avoided by including a poorly nucleophilic proton scavenger more basic than the starting amine in the reaction medium (see Example 3). In a typical example, N,N-dimethyl-t-butylamine (5.05 g, 50 mmole) dissolved in 10 ml of dichloroethane was added to a stirred, cooled (−35°C) solution of vinyl chloroformate (70 mmole) in 50 ml of 1,2-dichloroethane. The bath was removed and as the heterogeneous mixture began to warm to room temperature, 1,8-bis-(dimethylamino)naphthalene (10.7 g, 50 mmole) in 20 ml of dichloroethane was added. The solid initially present disappeared but was replaced by a new solid during the ensuring 14 hour reaction period at room temperature. The standard concentration, extraction, and vacuum distillation procedure afforded pure VOC-NMe$_2$; yield 4.63 g (83%); bp 43°C at 10 torr.

In another experiment a similar scheme involving an added proton scavenger was used to permit the direct use of N,N-dimethyl-t-butylamine hydrochloride as the reaction substrate: A solution of N-methyldicyclohexylamine (6.52 g, 33 mmole) in 5 ml of 1,2-dichloroethane was added to a stirred, cooled (−35°C) mixture of N,N-dimethyl-t-butylamine hydrochloride (4.60 g, 33 mmole) and vinyl chloroformate (40 mmole) in 1,2-dichloroethane. After 30 minutes at −35°C, the mixture was allowed to warm to room temperature and then refluxed for 30 minutes. The mixture was rotary evaporated and the amine salts removed by trituration with hexane. Evaporation of the hexane filtrate yielded 2.5 g (65%) of VOC-NMe$_2$ N-VOC-N-methylcyclohexylamine. by MeCHClOCONMe$_2$ or N-VOCN-methylcyclohexylamine.

EXAMPLE 8

Dealkylation of N-Methyldiisopropylamine and N-Methyldicyclohexylamine

No methyl cleavage products were found on dealkylation of either of these amines with vinyl chloroformate using the procedures of Example 1. Only cleavage of the secondary alkyl substituent occurred. The dealkylation of N-methyldicyclohexylamine was unusual in that no reaction occurred at −35°C and was slow even at room temperature. Therefore, the reaction mixture was refluxed longer than the usual 30 minutes prior to work-up. This unexpected observation led to the prediction that N-alkyldicyclohexylamines could be used as otherwise inert proton scavengers in other amine dealkylations (see Examples 3 and 7). Similar results in the N-methyldicyclohexylamine experiment were obtained when the reaction was preferred in tetrahydrofuran as the solvent. The properties of the dealkylation products are given below:

N-VOC-N-Methylisopropylamine; bp 33°–35.5°C at 0.3 torr.

Calculated for C$_7$H$_{13}$NO$_2$: C, 58.71%; H, 9.15%; N, 9.78%.

Found: C, 58.94%; H, 8.89%; N, 10.03%.

N-VOC-N-Methylcyclohexylamine; bp 119°C at 14 torr.

Calculated for C$_{10}$H$_{17}$NO$_2$: C, 65.54%; H, 9.35%; N, 7.64%.

Found: C, 65.76%; H, 9.05%; N, 7.81%.

EXAMPLE 9

Dealkylation of N,N-Dimethylcyclohexylamine, N,N-diethylcyclohexylamine, and N,N-Dimethylisopropylamine In the dealkylation of these first two title amines with vinyl chloroformate by the procedures of Example 8, cleavage of the secondary alkyl group was still the primary process. However, cleavage of a small amount of the other alkyl substituent also occurred. For example, in the reaction of N,N-dimethylcyclohexylamine, N-VOC-N-methylcyclohexylamine (data in Example 8) and VOC-NMe$_2$ (data in Example 6) were obtained in a 12:88 ratio when the experiment was done in 1,2-dichloroethane. The ratio was 10:90 in an experiment performed in tetrahydrofuran. Similar dealkylation in 1,2-dichloroethane of N,N-diethylcyclohexylamine afforded N-VOC-N-ethylcyclohexylamine and VOC-NEt$_2$ in a 9:91 ratio:

N-VOC-N-ethylcyclohexylamine: bp 117°–118°C at 12 torr.

Calculated for C$_{11}$H$_{19}$NO$_2$: C, 66.97%; H, 9.71%; N, 7.10%.

Found: C, 67.01%; H, 9.91%; N, 6.92%.

VOC-NEt$_2$; bp 63°C at 13 torr.

Calculated for C$_7$H$_{13}$NO$_2$: C, 58.72%; H, 9.15; N, 9.78%.

Found: C, 58.83%; H, 9.26%; N, 9.97%.

When N,N-dimethylisopropylamine was dealkylated with vinyl chloroformate in 1,2-dichloroethane under the conditions of the first procedure of Example 1 (same concentrations, reactants combined at −35°C, mixture refluxed 30 minutes before work-up) the ratio of isopropyl to methyl loss was 43:57. Both the VOC-NMe₂ product (data in Example 6) and the N-VOC-N-methylisopropylamine (data in Example 8) have previously been described. The N,N-dimethylisopropylamine system provided a unique opportunity to find out whether selectivity of alkyl group loss could be changed by variation of reaction conditions to enhance whichever process might be desired in those rare amines where two processes are closely competitive. Some example data demonstrating that such changes are possible are given in Table 1.

Table 1

| No. | Variation from conditions of Example 9 | Loss ratio iPr:Me |
|-----|----------------------------------------|-------------------|
| A | Reactants combined at 60–67°C; refluxed 1 hr before workup | 46:54 |
| B | Amount of solvent doubled; reagents combined and reacted for 24 hours at 25°C | 38:62 |
| C | Tetrahydrofuran used as solvent | 35:65 |
| D | Combined at 4°C in benzene; refluxed 12 hrs before workup | 38:62 |
| E | One eq. pyridine present | 43:57 |
| F | Two eq. Et₄N⁺Br⁻ present; amount of solvent doubled | 47:53 |

EXAMPLE 10

N-Dealkylation of Glaucine

Vinyl chloroformate (4 mmole) was added to a solution of glaucine (710 mg, 2 mmole) in 10 ml of 1,2-dichloroethane maintained at −35°C. The initially heterogeneous mixture became homogeneous on warming. After refluxing for 30 min, the volatiles were removed by vacuum evaporation. An ether solution of the residue was washed with 5% citrate (pH 4), 5% bicarbonate, and dried (Na₂SO₄). The 1-[N-VOC-N-methyl-2-aminoethyl]-3,4,6,7-tetramethoxyphenanthrene product obtained as a solid after removal of the ether was recrystallized once from ethanol/water; yield 753 mg (89%); mp 90°–93°C. Analytically pure material had a mp 91°–93°C.

Calculated for $C_{24}H_{27}NO_6$: C, 67.75%; H, 6.40%; N, 3.29%.

Found: C, 67.81%; H, 6.62%; N, 3.41%.

The same product could be obtained in 45% yield by addition of the vinyl chloroformate to a stirred solution of glaucine in 1:5 water:dioxane (25°C) containing a suspension of 0.2 g (5 mmole) of MgO.

EXAMPLE 11

N-Dealkylation of Hydrastine

Hydrastine (1.33 g, 3.47 mmole) in 10 ml of 1,2-dichloroethane was added to a rapidly stirred solution (at −35°C) of vinyl chloroformate (8 mmole) in 50 ml of 1,2-dichloroethane. The precipitate formed during the addition disappeared when the mixture was warmed to room temperature. After 30 min at reflux, the dichloroethane and excess vinyl chloroformate were removed in vacuo and the residue dissolved in ether. The ether solution was washed with citrate buffer (pH 4) and bicarbonate, dried (Na₂SO₄), and vacuum evaporated. The amorphous residue was purified by chromatography with benzene on silica gel. The enol lactone thus obtained

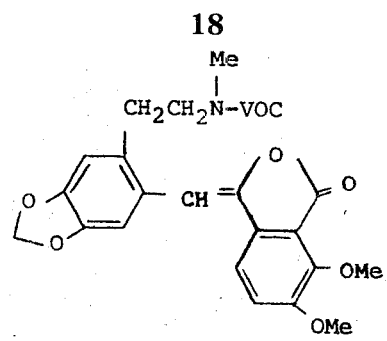

was an analytically pure pale yellow amorphous powder; yield 1.38 g (88%); mp 141°C dec.

Calculated for $C_{24}H_{23}NO_8$: C, 63.57%; H, 5.11%; N, 3.09%.

Found: C, 63.66%; H, 5.31%; N, 3.11%.

EXAMPLE 12

Protection of Aliphatic and Aromatic Hydroxyl Functions by Acylation with Vinyl Chloroformate A solution of cholesterol (490 mg, 1.27 mmole) and pyridine (395 mg, 5 mmole) in 50 ml of 1,2-dichloroethane was stirred vigorously at 0°C while vinyl chloroformate (5 mmole) in 5 ml of dichloroethane was added. The heterogeneous mixture thus obtained was warmed to room temperature and then heated at reflux overnight, affording a homogeneous solution. This was concentrated in vacuo to a residue which was partitioned between ether (50 ml) and 5% pH 4 citrate buffer (20 ml). A second extraction with the citrate buffer was followed by washing with two portions of 5% bicarbonate. The crude solid O-VOC-cholesterol obtained after vacuum evaporation of the dried (Na₂SO₄) ether layer was recrystallized from acetone; yield 540 mg (93%); mp 90.5°–91°C.

Calculated for $C_{30}H_{48}O_3$: C, 78.90%; H, 10.59%.

Found: C, 78.96%; H, 10.66%.

The method outlined above was also followed in the reaction of vinyl chloroformate (30 mmole) with β-naphthol (3.74 g, 26 mmole) and pyridine (2.21 g, 28 mmole) in 1,2-dichloroethane (50 ml). After the overnight reflux period, the reaction mixture was concentrated at reduced pressure and the residue partitioned between 60 ml of benzene and 20 ml of 5% pH 4 citrate buffer. The separated benzene layer was extracted with 20 ml of 1N NaOH, dried (Na₂SO₄), and evaporated in vacuo. This crystalline residue was dissolved in methanol. Water was added until the solution was slightly turbid and crystallization of the O-VOC-β-naphthol was effected by cooling; yield 5.35 g (95%); mp 48°–49°C.

Calculated for $C_{10}H_{13}O_3$: C, 72.89%; H, 4.67%.

Found: C, 73.11%; H, 4.60%.

In another reaction a mixture of phenol (4.70 g, 50 mmole) and pyridine (5.2 g, 66 mmole) in 10 ml of 1,2-dichloroethane was added to a cooled (0°C) stirred solution of vinyl chloroformate (67 mmole) in 50 ml of dichloroethane. After 14 hours at reflux, the mixture was cooled, diluted with ether, and extracted with water. The ether layer was dried (Na₂SO₄) and vacuum distilled to give pure O-VOC-phenol; yield 7.65 g (94%); bp 56°C at 0.4 torr (79°–80°C at 3 torr).

Calculated for $C_9H_8O_3$: C, 65.85%; H, 4.91%.

Found: C, 65.75%; H, 5.01%.

In another experiment vinyl chloroformate (60 mmole) in 10 ml of 1,2-dichloroethane was added to a stirred, cooled (−20°C) mixture of 3,5-dimethoxyphenol (7.7 g, 50 mmole) and N-methyldicyclohexylamine (9.7 g, 50 mmole) in 40 ml of dichloroethane. The mixture was then warmed to room temperature and left for 4 hours prior to extraction with pH 4 citrate buffer and aqueous bicarbonate. The product, O-VOC-3,5-dimethoxyphenol, was isolated from the organic layer by vacuum distillation; bp 110°C at 0.2 torr; yield 7.9 g, 71%.

O-VOC-$\beta$-Naphthol was also made by a pH stat method in which vinyl chloroformate (40 mmole) was added to a stirred solution of $\beta$-naphthol (2.47 g, 28 mmole) in 80 ml of cooled (0°C) stirred 5:3 dioxane/water. The pH stat end point was set at pH 7.0±0.1 and the titrator automatically added 6N NaOH as the vinyl chloroformate was dripped into the reaction mixture over a 10 minute period. Automatic base addition then slowed markedly and finally stopped after 15 minutes. The reaction mixture which now separated into two phases was extracted twice with ethyl acetate. Vacuum evaporation of the dried organic extracts afforded the crude product which was recrystallized as already described; yield 4.81 g (81%); mp 48°–48.5°C.

EXAMPLE 13

Determination of the Acidic and Basic Conditions under which the O-Vinyloxycarbonyl Protecting Group is Stable and under Which It Can Be Removed Cleanly from Alcohols and Phenols Sodium carbonate (116 mg, 1.1 mmole) in two ml of water was added to a stirred solution of O-VOC-$\beta$-naphthol (214 mg, 1.0 mmole) in 50 ml of dioxane and 3 ml of water. After 18 hours at 70°C the mixture was cooled and the reaction quenched with 10 ml of 5% pH 4 citrate buffer and 25 ml of benzene. The organic layer was separated and the aqueous phase extracted with more benzene. Concentration of the dried (Na$_2$SO$_4$) organic extracts gave a tan solid from which pure $\beta$-naphthol was isolated by vacuum sublimation; yield 138 mg (96%); mp 122°–123°C. Using infrared analysis it was determined that the reaction was half complete after about 1.5 hours.

In another experiment sodium carbonate (54 mg, 0.5 mmole) in two ml of water was added to a rapidly stirred solution of O-VOC-cholesterol (214 mg, 0.47 mmole) in 50 ml of dioxane containing 3 ml of water. The mixture was then heated at 65°C for 24 hours, cooled and diluted with 10 ml of 5% pH 4 citrate buffer and 20 ml of ether. After separation, the aqueous phase was extracted with more ether. The crude cholesterol obtained from the dried (Na$_2$SO$_4$) ether extracts after concentration was recrystallized from methanol/ether; yield 177 mg (97%); mp 147°–147.5°C. Infrared and chromatographic analysis indicated that the reaction was about half complete after 16 hours at room temperature.

In a competition experiment designed to test whether the vinyloxycarbonyl amide group is stable under the mild basic conditions required for removal of an O-VOC group, a solution of N-VOC-guvacoline (211 mg, 1 mmole), O-VOC-cholesterol (456 mg, 1 mmole), and 4 ml of water in 50 ml of dioxane was stirred at room temperature while 1.0 ml of 1.0N NaOH was added. Infrared analysis of an aliquot taken at 6 hours showed that while the O-VOC-cholesterol was hydrolyzing to cholesterol, no similar cleavage of the N-VOC-group had occurred. Partial hydrolysis of the guvacoline methyl ester function occurred indicating that the base stability sequence is: O-VOC < methyl ester << N-VOC. Another experiment demonstrated that under conditions in which the methyl ester group was completely transesterified or hydrolyzed with KOD/D$_2$O in CD$_3$OD, the N-VOC group survived intact.

The absolute stability of the O-VOC group in acid and its relative stability versus the N-VOC group were demonstrated by the following experiments.

A CH$_2$Cl$_2$ (25 ml) solution of O-VOC-$\beta$-naphthol (214 mg, 1 mmole), N-VOC-guvacoline (211 mg, 1 mmole), and 1.61 g of 10% anhydrous methanolic HBr (2 mmole HBr) was kept at room temperature for 12 hours and then evaporated at reduced pressure. The residue was partitioned between ether and 5% pH 4 citrate buffer. The separated ether layer was washed with 5% NaHCO$_3$, dried (Na$_2$SO$_4$), and vacuum evaporated to a crude solid, O-VOC-$\beta$-naphtnol (quantitative yield), mp 41°–43°C. Infrared, nmr, and chromatographic analysis confirmed the absence of free $\beta$-naphthol and N-VOC-guvacoline, which was quantitatively converted to guvacoline hydrobromide (see Example 3) under these conditions.

The preceding experiment was repeated with O-VOC-cholesterol (456 mg, 1 mmole) in place of the O-VOC-$\beta$-naphtnol. The initial residue was again partitioned between ether and citrate buffer. Evaporation of the dried (Na$_2$SO$_4$) ether extract afforded 455 mg of crude solid O-VOC-cholesterol (mp 89.5°–90°C) uncontaminated by free cholesterol or N-VOC-guvacoline.

In another experiment O-VOC-cholesterol (2 mmole) was recovered in 93% yield after solution in 10 ml of ether containing 2 ml of 2N anhydrous methanolic HCl for 72 hours at room temperature.

To test the relative base lability of O-VOC derivatives of alcohols and phenols, Na$_2$CO$_3$ (117 mg, 1.1 mmole) in 4 ml of water was added to a stirred solution of O-VOC-$\beta$-naphthol (214 mg, 1 mmole) and O-VOC-cholesterol (456 mg, 1 mmole) in 50 ml of dioxane equilibrated at 48°C. Aliquots were taken at 0.0, 0.8, 19, and 24 hours and worked up by dilution with one ml of citrate buffer (pH 4) and one ml of CCl$_4$. The quantity and ratio of the remaining VOC esters were determined from the intensities of the two infrared C=O stretch absorbences (5.60 and 5.68 microns) of the dried (Na$_2$SO$_4$) CCl$_4$ extracts. After 24 hours ca. 60% of the O-VOC-cholesterol and 40% of the O-VOC-$\beta$-naphthol remained.

The relative and absolute acid stability of O-VOC derivatives of alcohols and phenols was similarly tested. A solution of the same two VOC esters (1 mmole of each) in 6.0 ml of 2N aqueous HCl (12 mmole of HCl) and 50 ml of dioxane was maintained at 85°C. Aliquots (1 ml) were taken at 0, 2, 24, and 48 hours and worked up by dilution with 5% NaHCO$_3$ and CCl$_4$ (1 ml of each). The dried CCl$_4$ extracts were again analyzed by infrared. Little hydrolysis had taken place after two hours. After 24 hours ca. 50% of the total esters had reacted and the ratio of the recovered O-VOC-cholesterol to O-VOC-$\beta$-naphthol was 59:41. After 48 hours this ratio was 75:25 and only ca. 25% of the total esters remained. In an earlier test no detectable hydrolysis of either ester had occurred after 20 hours at 40°C.

In another experiment it was shown (gas chromatographic analysis) that hydrolysis of O-VOC-phenol to phenol was only half complete after 80 minutes in 2N aqueous methanolic (1:4) HCl solution at 60°C. Hydrolysis was complete after 14 hours. The O-VOC-phenol was recovered in near quantitative yield after treatment with a 10-fold excess of 2N anhydrous HCl in dioxane at room temperature for 3 hours.

EXAMPLE 14

One Step O-Protection and N-Dealkylation of Boldine

A solution of vinyl chloroformate (50 mmole) in 5 ml of 1,2-dichloroethane was dripped into a partially dissolved slurry of bolding chloroform (3.70 g, 8.3 mmole) in 50 ml of dichloroethane. As the addition to the stirred, cooled (0°C) mixture progressed, the boldine dissolved and a second solid appeared. After warming the mixture to room temperature, 1,8-bis-(dimethylamino)-naphthalene (5.33 g, 25 mmole) in 10 ml of dichloroethane was added (10 min) producing a homogeneous solution. During the ensuing 4 hour reflux period, a white solid (the HCl salt of the diaminonaphthalene) precipitated. The reaction mixture was then concentrated and the residue partitioned between ether and 5% aqueous citric acid. After separation, the ether layer was washed with citrate buffer (pH 4) and 5% bicarbonate, dried ($Na_2SO_4$), and evaporated in vacuo. The 1-[N-VOC-N-methyl-2-aminoethyl]-3,7-di-O-VOC-4,6-dimethoxyphenanthrene thus obtained as an amorphous powder was crystallized from hot isobutyl alcohol; 1st crop 3.75 g (77 % yield), mp 101.5°–103°C (analytically pure); 2nd crop 0.45 g (9%), mp 100.5°–102°C; 3rd crop 0.03 g (1%), mp 98°–100.5°C. The total yield was 87%.

Calculated for $C_{28}H_{27}NO_{10}$: C, 62.57%; H, 5.06%; N, 2.61%.

Found: C, 62.51%, H, 4.70%; N, 2.56%.

EXAMPLE 15

One Step Phenolic O-Protection and N-Demethylation of Codeine

A solution of 5.1 g (16.1 mmole) of codeine hydrate in 50 ml of 1,2-dichloroethane was first dried with 4A molecular seives and then cooled to −35°C. Vinyl chloroformate (21 mmole) was then added slowly followed by 0.64 g of N-methyldicyclohexylamine. The mixture was warmed to room temperature then cooled to −20°C while another 21 mmole of vinyl chloroformate followed by 2.55 g of N-methyldicyclohexylamine was added. The new homogeneous solution was left at room temperature for two days, then concentrated in vacuo, and the residue partitioned between ether and aqueous 5% citric acid. The ether layer was extracted with pH 4 citrate buffer, 5% aqueous $NaHCO_3$, and water, dried ($Na_2SO_4$), and concentrated to an oil which was chromatographed on silica with 3:1 chloroform/acetone to give O,N-di-VOC-norcodeine as an analytically pure amorphous powder of mp 63°–65°C.

Calculated for $C_{23}H_{23}NO_7$: C, 64.93%; H, 5.45%; N, 3.29%.

Found: C, 65.08%; H, 5.69%; N, 3.22%.

A small sample of O,N-di-VOC-norcodeine was converted to free norcodeine (mp 182°–184°C after crystallization from acetone) by refluxing for 15 hours in a 1:4 mixture of dioxane and 2N hydrochloric acid. The reaction mixture was neutralized to pH 8 with $Na_2CO_3$ prior to extraction of the product into chloroform.

EXAMPLE 16

Conversion of Hordenine to N-Methyltyramine

A. Selective O-Protection with Vinyl Chloroformate

Vinyl chloroformate (10 mmole) in 10 ml of 1,2-dichloroethane was added to a solution of hordenine (1.50 g, 9.1 mmole) at 25°C in 20 ml of dichloroethane. The heterogeneous mixture was refluxed overnight, then concentrated, and the residue partitioned between 40 ml of ether and 11 ml of 1N NaOH. Vacuum evaporation of the dried ($Na_2SO_4$) ether layer afforded O-VOC-hordenine as a very viscous oil which was spectroscopically pure; 1.74 g (87%). Small amounts of this material (strong infrared absorption at 5.62 microns in $CHCl_3$) could be vacuum distilled (85°C at 0.2 torr) but extensive decomposition occurred when attempts were made to purify larger quantities of the product by this method. Instead the O-VOC-hordenine was analyzed as its HCl salt which was made by adding anhydrous ethanolic HCl to an acetone solution of this amine; recrystallized from acetone/ether, mp 158°–159°C.

Calculated for $C_{13}H_{18}NO_3Cl$: C, 57.46%; H, 6.68%; N, 5.16%; Cl, 13.05%

Found: C, 57.24%; H, 6.44%; N, 5.34%;, Cl, 13.10%.

Free O-VOC-hordenine was also made by adding vinyl chloroformate (10 mmole) to a suspension of hordenine (10 mmole) in 50 ml of ether at 0°C. The mixture was stirred for 23 hours at room temperature before work-up.

B. One Step O-Protection and N-Demethylation

Vinyl chloroformate (46 mmole) was added (5 min) to a stirred, cooled (0°C) solution of hordenine (3.30 g, 20 mmole) in 50 ml of 1,2-dichloroethane. A solid precipitated but the mixture became homogeneous during the addition (15 min) of 1,8-bis-(dimethylamino)-naphthalene (4.28 g, 20 mmole) (in 10 ml of dichloroethane). During the subsequent warming and 30 minutes reflux period, the reaction solution again became heterogeneous. The residue left after concentration of the reaction mixture at reduced pressure was partitioned between 100 ml of ether and 30 ml of 5% pH 4 citrate buffer. The ether layer was extracted with 30 ml of 5% $NaHCO_3$, dried ($Na_2SO_4$), and vacuum distilled to give pure N,O-diVOC-N-methyltyramine; yield 4.84 g (83%); bp 162°–164°C at 0.3 torr (151°–153°C at 0.1 torr).

Calculated for $C_{15}H_{17}NO_5$: C, 61.85%; H, 5.88%; N, 4.81%.

Found: C, 62.22%; H, 5.97%; N, 5.10%.

C. N-Demethylation of O-VOC-Hordenine

Vinyl chloroformate in 5 ml of 1,2-dichloroethane was added to a stirred, cooled solution (−35°C) of O-VOC-hordenine (775 mg, 3.19 mmole) in 40 ml of dichloroethane. After refluxing for 30 minutes, the mixture was concentrated to a viscous oil which contained a 79% yield of N,O-diVOC-N-methyltyramine.

In an experiment performed by combining 2.7 g of O-VOC-hordenine and 15.3 mmole of vinyl chloroformate in 20 ml of benzene at 25°C and then heating at 70°C for 26 hours, the yield of distilled N,O-diVOC-N-methyltyramine was 55%.

D. Selective Base Cleavage of N,O-Divinyloxycarbonyl-N-methyltyramine

Sodium hydroxide (82.2 mg, 2.05 mmole) in 10 ml of water was added to a stirred solution of N,O-diVOC-N-methyltyramine (571 mg, 1.96 mmole) in 30 ml of dioxane. After 12 hours at room temperature, the reaction mixture (ca. pH 8) was extracted with five 10 ml portions of $CH_2Cl_2$ which were combined, dried ($Na_2SO_4$), and concentrated. The crude N-VOC-N-methyltyramine (387 mg) thus obtained was purified by chromatography on silica gel (chloroform as eluant); yield 325 mg (75%) of a viscous, colorless liquid (strong infrared band at 5.83 microns in $CH_2Cl_2$).

A sample of the N-VOC-N-methyltyramine was converted to its crystalline α-naphthylurethane derivative with α-naphthyl isocyanate. After chromatography on alumina (ether as eluant), the product was recrystallized from ether/petroleum ether; mp 109°–110.5°C.

Calculated for $C_{23}H_{22}N_2O_4$: C, 70.76%; H, 5.68%; N, 7.18%.

Found: C, 70.52%; H, 5.86%; N, 7.20%.

E. Selective Acid Cleavage of N,O-Divinyloxycarbonyl-N-methyltyramine

A solution of N,O-diVOC-N-methyltyramine (428 mg, 1.48 mmole) and freshly prepared 10% anhydrous ethanolic HBr (1.25 g, 1.55 mmole of HBr) was kept at room temperature for 14 hours and then evaporated in vacuo. The residue, O-VOC-N-methyltyramine hydrobromide, was recrystallized from acetone/ether; yield 400 mg (90%); mp 121°–122°C. This material was analytically pure.

Calculated for $C_{12}H_{16}NO_3Br$: C, 47.70%; H, 5.34%; N, 4.64%.

Found: C, 47.44%; H, 5.40%; N, 4.65%.

F. Complete Acid Cleavage of N,O-Divinyloxycarbonyl-N-methyltyramine

N,O-diVOC-N-methyltyramine (301 mg, 1.03 mmole) was dissolved in 35 ml of 5% anhydrous methanolic HCl (28.4 g, 39 mmole of HCl) and refluxed 14 hours. Vacuum evaporation of the solution gave a solid, crude N-methyltyramine hydrochloride, which was triturated with hot ethyl acetate. The mixture thus obtained was refrigerated for two hours, then filtered, and the crystals dried in vacuo overnight; yield 186 mg (96%); mp 143°–146°C. Recrystallization from acetone raised the mp to 147.5°–148°C.

G. Conversion of Hordenine to N-Methyltyramine Hydrochloride Without Isolation of Intermediates.

First, hordenine (1.65 g, 10 mmole) was treated with vinyl chloroformate (23 mmole) in the presence of 1,8-bis-(dimethylamino)-naphthalene (2.14 g, 10 mmole) by the method in B. After work-up, the residue from evaporation of the ether extract (crude N,O-diVOC-N-methyltyramine) was dissolved in 100 g of 10% anhydrous methanolic HCl (275 mmole of HCl). This solution was refluxed for 5 hours and then concentrated to give N-methyltyramine hydrochloride as a crude solid which was purified by the trituration scheme described in F; overall yield 1.62 g (87%); mp 144°–146°C.

EXAMPLE 17

One Step O-Protection and N-Demethylation of Morphine

Morphine hydrate (Mallinckrodt, purified powder) (6.06 g, 20 mmole) was dried at 150°C and 1.0 torr for 25–30 minutes in the reaction vessel, a 250 ml three neck flask fitted with a teflon stirring bar and a condenser (no coolant in this step) topped by a vacuum adapter with stopcock. After desiccation the vacuum was replaced by an $N_2$ atmosphere and thereafter the apparatus was maintained under a slight positive $N_2$ pressure. 1,2-dichloroethane (35 ml) was added to the morphine and two graduated pressure equalizing dropping funnels were attached to the reaction flask. The first contained vinyl chloroformate (100 mmole) in dichloroethane (total volume = 20 ml) and the second, 1,8-bis-(dimethylamino)-naphthalene (10.1 g, 47.2 mmole) in the same solvent (total volume = 20 ml). The morphine slurry was then stirred at room temperature while 8.0 ml (40 mmole) of the vinyl chloroformate solution was dripped in (10 min). No perceptible reaction occurred. Next, half of the 1,8-bis-(dimethylamino)-naphthalene solution (24 mmole) was added over a 15 minute period. Heat was evolved and, after only the first three ml had been added, the reaction mixture became homogeneous. As soon as this occurred, the reaction vessel was immersed in an ice bath and cooling and stirring were continued throughout the subsequent additions. After the first half of the 1,8-bis-(dimethylamino)-naphthalene had been added, the remainder of the vinyl chloroformate solution was dripped in (20–30 min). As each drop touched the surface of the mixture, a white solid instantly precipitated and then quickly dissolved. Upon completion of this step, the rest of the base was added (15 min) to the initially homogeneous solution. During this process a white solid (the HCl salt of 1,8-bis-(dimethylamino)-naphthalene) gradually precipitated. The reaction mixture was stirred overnight at 40°C, then evaporated to a solid residue at reduced pressure in the reaction vessel, and finally partitioned between 150 ml of ether and 40 ml of 5% citric acid. The reaction vessel was rinsed with 50 ml of ether and this ether solution was used to back extract the separated aqueous layer (which was pH 4). The combined ether extracts were then washed with 20 ml each of 5% pH 4 sodium citrate and 5% $NaHCO_3$ and dried with a 1:1 mixture of $CaCl_2$ and $MgSO_4$. The filtered solution was concentrated in vacuo to a white amorphous foam. Efforts to crystallize this crude N,O,O-triVOC-normorphine which was ordinarily obtained in yields greater than 95% failed. However, it was conveniently stored and handled as flocculent, white powder which was precipitated from methanol with water: a solution of the total foam in 60 ml of methanol was dripped into 600 ml of rapidly stirred water at room temperature. The product was filtered and dried overnight in vacuo at room temperature; yield 8.85 g (91%). This amorphous powder (transition to colorless glass at 65°–70°C) has the same infrared spectrum (including the 3 carbonyl stretch intensity ratios) as the initial foam and its C, H, N analysis was close for all three elements: off 1%, 0.5%, and 0.4%, respectively, versus the calculated values for N,O,O-tri-VOC-normorphine. The product was further purified for analysis by preparative thin layer chromatography on silica gel. The sample was extracted from the adsorbent with chloroform. The chloroform was evaporated and the remaining glass dried overnight in vacuo at 25°C before analysis. Identical material could be isolated on a large scale by column chromatography on neutral alumina with 9:1 acetone-methanol.

Calculated for $C_{25}H_{23}NO_9$: C, 62.37%; H, 4.82%; N, 2.91%.

Found: C, 62.17%; H, 5.13%; N, 2.81%.

In another experiment the above procedure was used with 40 mmole of N-methyldicyclohexylamine in place of the 1,8-bis-(dimethylamino)-naphthalene. In this reaction the product, N,O,O-triVOC-normorphine, was contaminated by ca. 5% N-VOC-N-methylcyclohexylamine which could be reduced to a trace by trituration with hexane.

EXAMPLE 18

Conversion of N,O,O,-trivinyloxycarbonylnormorphine to Normorphine

A solution of N,O,O-triVOC-normorphine (crude foam) (9.3 g, 19.3 mmole) and 3 ml of concentrated hydrochloric acid (36 mmole of HCl) in 200 ml of methanol was refluxed for 4 hours. After cooling, 8.0 g (200 mmole) of pulverized NaOH was added and the mixture heated another 4 hours, cooled, and filtered. The filtrate was concentrated to 60 ml, diluted with 100 ml of 1N NaOH and extracted with three 100 ml portions of chloroform. The aqueous solution was decolorized with 0.2 g of Nuchar and filtered through Celite. After acidification to pH 2 (conc. HCl), the Nuchar treatment was repeated. Concentrated $NH_4OH$ was added to the stirred pale yellow filtrate until the pH reached 8.5. The precipitate that formed was filtered, washed with ice water, and dried at 0.2 torr (25°C) overnight. The 3.37 g of normorphine thus obtained was a cream colored solid of mp 275°–277°C.

EXAMPLE 19

Selective Conversion of N,O,O-Trivinyloxycarbonylnormorphine to O,O-Divinyloxycarbonylnormorphine Hydrobromide Ten percent anhydrous ethanolic HBr (16.1 g, 20 mmole of HBr) was added to N,O,O-triVOC-normorphine (4.82 g, 10 mmole) in 12 ml of ether and 4 ml of ethanol and the initially homogeneous solution was left at room temperature for 2 days. The solid which precipitated during this period was filtered in a dry $N_2$ atmosphere, washed with two 30 ml portions of 3:1 ether/ethanol, and dried in vacuo for 12 hours. The white, powdery, nonhygroscopic O,O-diVOC-normorphine hydrobromide thus obtained was analytically pure; yield 4.42 g (90%); mp 228°–229°C dec.

Calculated for $C_{22}H_{22}BrNO_7$: C, 53.67%; H, 4.50%; N, 2.84%; Br, 16.23%.

Found: C, 53.97%; H, 4.64%; N, 2.83%; Br, 16.25%.

A $CCl_4$ solution of O,O-diVOC-normorphine free base was obtained by dissolving the HBr salt in 5% aqueous $NaHCO_3$ and extracting with $CCl_4$. This material had strong infrared bands at 5.62 and 5.68 microns.

The N,O,O-triVOC-normorphine could also be converted to O,O-diVOC-normorphine hydrochloride by treatment with anhydrous HCl in ethanol at room temperature but the crystals which initially formed were very hygroscopic and thus not easily isolated. The identity of this material was confirmed by conversion to the free base by the procedure above.

EXAMPLE 20

Conversion of O,O-Divinyloxycarbonylnormorphine hydrobromide via N-Allyl-O,O-divinyloxycarbonylnormorphine to Nalorphine O,O-diVOC-normorphine hydrobromide (1.00 g, 2.03 mmole) was suspended in 10 ml of absolute ethanol in a 100 ml three neck flask which also contained 0.255 g (2.06 mmole) of allyl bromide and a teflon stirring bar. The reaction vessel was fitted with a condenser topped by a vacuum adapter with stopcock and then purged with $N_2$. Thereafter the system was maintained under a slight positive $N_2$ pressure. The mixture was heated to 70°C with stirring and solid anhydrous sodium carbonate (0.206 g, 2.03 mmole) was added in small portions (10 min). During the ensuing 6 hour reaction period, the morphine salt initially present as a fine powder slowly disappeared but a much coarser solid remained.

[A small sample of this reaction solution was evaporated and the residue triturated with CCl 4. Spectroscopic analysis of the $CCl_4$ solution (strong infrared absorption at 5.60 and 5.66 microns) showed that N-allyl-O,O-diVOC-normorphine had been formed.]

Next 18 ml of 6% hydrochloric acid (30 mmole of HCl) was dripped (5 min) into the hot reaction mixture which then became homogeneous. The bath temperature was raised to 105°C, most of the ethanol was distilled off (final volume: 20 ml), and heating was continued for 8 hours. Then the solution was cooled, diluted with 30 ml of chloroform, and the stirred mixture neutralized to pH 8 with saturated aqueous $K_2CO_3$. The two layers were separated and the water layer extracted with two more 20 ml portions of chloroform. The pooled chloroform extracts were dried ($Na_2SO_4$), decolorized with ca. 0.2 g of Nuchar, filtered through Celite, and evaporated in vacuo to a tan foam (0.630 g; the theoretical yield of nalorphine was 0.632 g). This foam was dissolved in 2 ml of chloroform and diluted with 50 ml of ether. A brown flocculence appeared. This was filtered off and the filtrate was vacuum evaporated yielding a residue which was dissolved in 2–3 ml of purified methyl acetate. Nalorphine rapidly crystallized out. After 3 hours at 0°C the solid was filtered under $N_2$, washed with 2–3 ml of cold (0°C) methyl acetate, and then dried in vacuo; first crop yield 421 mg (67%); mp 204.5°–206.5°C. Concentration of the filtrate at reduced pressure gave a semi-solid mass which was triturated with 5 ml of ether, cooled, and filtered under $N_2$; second crop yield 102 mg (16%); mp 202°–203.5°C; total yield 83%. The product was spectroscopically and chromatographically pure and identical with pure nalorphine made by classical methods.

In another experiment the above allylation procedure was followed (double scale). At the end of the 6 hour reaction period at 70°C, 20 ml of ethanol and a solution of 870 mg (8.2 mmole) of $Na_2CO_3$ in 10 ml of water were added. The stirred heterogeneous mixture was heated for 12 hours at 65°C, then cooled, acidified to pH 1 (conc. HCl), decolorized with 0.1 g of Nuchar, and filtered through Celite. The yellow filtrate was extracted with two 50 ml portions of ether, made basic (pH 8) with solid $NaHCO_3$, and extracted twice with chloroform (80 ml total). The dried ($Na_2SO_4$) chloroform extract was vacuum evaporated and the residue (1.39 g) dissolved in 50 ml of ether. A small amount of insoluble material was filtered off and the filtrate was concentrated until crystals began to form. After two hours at 25°C the nalorphine product was collected and dried in vacuo; yield 835 mg (66%); mp 202°–204°C.

EXAMPLE 21

Preparation of Nalorphine from Morphine without Isolation of Intermediates

Other experiments indicated that much of the loss incurred on conversion of morphine to nalorphine by the combined processes given in Examples 17, 19, and 20 was manipulative loss which occurred during the final purifications. Also most of the trace impurities in the crude products could also serve as nalorphine precursors (though not as efficiently as the main reaction product). A typical procedure in which intermediates are not purified follows.

The first step, conversion of morphine to N,O,O-triVOC-normorphine, was carried out by the first procedure described in Example 17 using 6.06 g (20 mmole) of morphine hydrate, 100 mmole of vinyl chloroformate and 47 mmole of 1,8-bis-(dimethylamino)-naphthalene. After the extractions were completed, the $CaCl_2$-$MgSO_4$ dried ether solution was transferred to a 500 ml three neck flask in which all the remaining reactions were performed. The ether was evaporated at reduced pressure and the foam thus obtained was dissolved in 25 ml of ether and 7 ml of ethanol. Then 32.2 g of 10% anhydrous ethanolic HBr (40 mmoles of HBr) was added and the solution left for two days at room temperature. During this time the O,O-diVOC-normorphine hydrobromide salt slowly precipitated. Ethanol (50 ml) was added and the excess acid neutralized with 1.68 g (20 mmole) of solid $NaHCO_3$. The suspension was stirred until gas evolution ceased (1 hr) and volatile materials were then removed in vacuo. Allyl bromide (2.42 g, 20 mmole) was weighed into the reaction vessel followed by 90 ml of ethanol. The system was purged with $N_2$ for a minute and the solution was heated to 68°C. Solid $Na_2CO_3$ (2.33 g, 22 mmole) was added in small portions over a 30 minute period and heating and stirring were continued for another 5 hours. Then 125 ml of 6% hydrochloric acid (208 mmole) was added (30 min) and the bath temperature raised to 105°C. Much of the ethanol was permitted to distill from the reaction mixture in an $N_2$ stream. When the remaining volume was ca. 150 ml (ca. 1.5 hr) the distillation was stopped but the solution was heated for another 8.5 hours. The reaction mixture was cooled, washed with three 200 ml portions of ether, neutralized to pH 8 with saturated aqueous $K_2CO_3$, and extracted with three 200 ml portions of chloroform. The dried ($Na_2SO_4$) chloroform extract was decolorized with 0.2 g of Nuchar, filtered through Celite, and vacuum evaporated to a tan foam which was dissolved in 15 ml of chloroform and diluted with 200 ml of ether. The flocculent material (200 mg) was filtered off and the filtrate was concentrated to a residue (5.88 g, only evacuated 1 hr) which was dissolved in 20 ml of methyl acetate (purified) and crystallized. The mixture was kept in the refrigerator overnight, then filtered under $N_2$ to give the first crop of nalorphine which was dried in vacuo; yield 4.14 g (67%); mp 204°–205°C. Concentration of the filtrate afforded a second crop; 0.59 g (9.4%); mp 201.5°–204°C. This provided an overall 76% yield. The infrared and nmr spectra of both crops were identical to those of a comparison sample of nalorphine. More product could be obtained by chromatography of the second crop filtrate.

EXAMPLE 22

Conversion of $O^3$,$O^6$-Diacetylmorphine to $O^3$,$O^6$-Diacetylnormorphine Hydrochloride Vinyl chloroformate (10 mmole) was added (room temperature under $N_2$) to a stirred solution of $O^3$,$O^6$-diacetylmorphine (from morphine and acetyl chloride, mp 171°–172°C (3.00 g, 8.13 mmole) in 10 ml of 1,2-dichloroethane. The mixture was heated first at 40°C for 4 hours and then at 70°–75°C for another half hour. The solution was concentrated at reduced pressure to a residue which was partitioned between 60 ml of ether and 5 ml of water and separated. [$O^3$,$O^6$-diacetylmorphine (170 mg, 6%) was recovered from the aqueous phase by neutralization with $NaHCO_3$ followed by extraction into $CH_2Cl_2$.] The ether layer was washed with 5 ml of 5% pH 4 citrate and 5 ml of water, dried ($Na_2SO_4$), and evaporated in vacuo affording an amorphous solid (3.10 g) which was identified as essentially pure N-VOC-$O^3$,$O^6$-diacetylnormorphine. The infrared spectrum of this product contained strong C=O stretch peaks at 5.61, 5.72, and 5.81 microns ($CCl_4$) and the nmr ($CCl_4$) contained both acetyl methyl resonances (2.06 and 2.19 ppm), and the vinyloxy absorption but no N-Me peak.

Anhydrous HCl gas was bubbled through a solution of the N-VOC-$O^3$,$O^6$-diacetylnormorphine in 50 ml of $CH_2Cl_2$ for 15 minutes and then very slowly for another hour. The volatiles were stripped off in vacuo, 25 ml of methanol was added, and the solution was refluxed for 2 hours. After vacuum evaporation of the methanol, $O^3$,$O^6$-diacetylnormorphine hydrochloride was obtained as a crystalline solid; mp 246°–249°C dec; yield 2.63 g or 88% of the reacted $O^3$,$O^6$-diacetylmorphine. A sample of the product recrystallized from methanol-ether had a mp of 248.5°–251.5°C dec (nmr:acetyl methyl resonances at 2.06 and 2.24 ppm in DMSO-$d_6$).

A small sample of the $O^3$,$O^6$-diacetylnormorphine hydrochloride in water was neutralized with $NaHCO_3$ and extracted with $CCl_4$ to obtain a solution of the free base, $O^3$,$O^6$-diacetylnormorphine which showed two strong carbonyl stretch absorptions at 5.63 and 5.73 microns.

In another experiment the intermediate adduct from addition of HCl to the N-VOC double bond of N-VOC-$O^3$,$O^6$-diacetylnormorphine (i.e., N-$CH_3CHClO_2C$-$O^3$,$O^6$-diacetylnormorphine) was characterized. In the nmr spectrum ($CCl_4$) of this species the methyl of the $CH_3CHCl$-group was seen as expected doublet at 1.8 ppm (J = 6 cps).

EXAMPLE 23

Conversion of $O^3$,$O^6$-Diacetylnormorphine Hydrochloride to Nalorphine

Sodium bicarbonate (1.26 g, 15 mmole) was added in portions (1.5 hours) to a stirred (under $N_2$), refluxing mixture of unpurified $O^3$,$O^6$-diacetylnormorphine hydrochloride (2.63 g, 6.7 mmole) and allyl bromide (0.91 g, 7.5 mmole) in 25 ml of methanol. After 8 hours the methanol was distilled off while 20 ml of 3N hydrochloric acid was added. This mixture was refluxed overnight, then cooled, neutralized to pH 8.5 with saturated $Na_2CO_3$ and extracted with five 100 ml portions of chloroform. The combined chloroform extracts were dried ($Na_2SO_4$), decolorized with Nuchar, and evaporated in vacuo to give 1.8 g of crude nalorphine. Product of m.p. 204.5°–206.5°C was obtained by crystallization from methyl acetate according to the method of Example 21.

EXAMPLE 24
Conversion of O³,O⁶-Diacetylnalorphine to O³,O⁶-Diacetylnormorphine Hydrochloride A sample of O³,O⁶-diacetylnalorphine was made by refluxing nalorphine with acetic anhydride in benzene for 3 hours. The product was separated from unacetylated and monoacetylated amines by extraction from 1 N hydrochloric acid into chloroform. The free O³,O⁶-diacetylnalorphine was liberated by subsequent extraction with a slight excess of aqueous sodium bicarbonate and purified by crystallization first from ethyl acetate and then from ethanol; mp 136–138°C.

Vinyl chloroformate (2 mmole) was added to a solution of O³,O⁶-diacetylnalorphine (395 mg, 1.0 mmole) in 1.5 ml of 1,2-dichloroethane. The mixture (under $N_2$) was first heated at 40°C for an hour and then at 60°C for another hour. After cooling the solution was concentrated at reduced pressure to a gummy residue which was taken up in 10 ml of 1:1 ether-ethyl acetate and extracted twice with 3 ml of water, once with 2 ml 5% pH 4 citrate, once with 1 ml of 1% $NaHCO_3$, and once with 2 ml of water. The organic layer was dried ($Na_2SO_4$) and evaporated in vacuo yielding 360 mg of O³,O⁶-diacetyl-N-VOC-normorphine as an amorphous solid whose infrared and nmr spectra were identical to the spectra of material previously obtained in Example 22 from O³,O⁶-diacetylmorphine. O³,O⁶-Diacetylnalorphine (55 mg) was recovered from the first 2 water extracts above by neutralization with bicarbonate followed by extraction into chloroform. Thus, after subtracting this recovered starting material the yield of the product, O³,O⁶-diacetyl-N-VOC-normorphine, was 98%.

As a further guarantee of structure the product was converted to O³,O⁶-diacetylnormorphine hydrochloride by treatment with HCl gas in methylene chloride followed by heating in methanol using the detailed method in Example 22. The new material (326 mg or 98%) was identical (mp, spectral data) to that previously obtained in Example 22.

EXAMPLE 25
N-Demethylation of 14-Hydroxydihydrocedeinone

Vinyl chloroformate (11.5 mmole) and then 1,8-bis-(dimethylamino)-naphthalene (921 mg, 4.3 mmole) was added at 30°C (under $N_2$) to a stirred solution of 14-hydroxydihydrocodeinone (945 mg, 3.0 mmole) (mp 218°C) in 7 ml of 1,2-dichloroethane. This was heated at 55°C for 2 hours and then at reflux for 30 minutes. The mixture was concentrated at reduced pressure and then taken up in 25 ml of 1:1 chloroform-methylene chloride which was extracted with 0.1 N HCl and 1% $NaHCO_3$. The organic layer was evaporated in vacuo, replaced by 30 ml of 1:1 ether-ethyl acetate, and again extracted with 0.1 N HCl and 1% $NaHCO_3$. Vacuum removal of the dried ($Na_2SO_4$) organic solvent yielded an amorphous solid (777 mg) which was identified (infrared and nmr spectra, tlc with 9:1 methylene chloride-methanol) as N-VOC-14-hydroxydihydronorcodeinone ($R_f$ 0.5) containing an appreciable amount of N-VOC-14-O-VOC-dihydronorcodeinone ($R_f$ 0.8).

[In another experiment both products were isolated by chromatography: the N-VOC-14-hydroxydihydronorcodeinone had strong infrared carbonyl stretch absorptions at 5.78 and 5.83 microns in methylene chloride; the same region in the spectrum of the N-VOC-14-O-VOC-dihydronorcodeinone had strong peaks at 5.66, 5.78, and 5.83 microns. The nmr spectrum of the product mixture contained the O-Me resonance at 3.9 ppm ($CDCl_3$) but no N-Me peak.]

Most of the above VOC N-demethylation product mixture was refluxed for an hour in 20 ml of 1.0 M $H_2SO_4$ containing 10 ml of dioxane. The mixture was cooled, neutralized with $Na_2CO_3$, evaporated, and extracted with chloroform. The chloroform was removed in vacuo and the residue was dissolved in 25 ml of 1:1 dioxane-water containing 0.3 g of $Na_2CO_3$ and refluxed for 3 hours. After solvent evaporation the residue was partitioned between water and chloroform. The aqueous layer was extracted with more chloroform and the combined chloroform extracts were dried ($Na_2SO_4$) and concentrated to a residue (0.47 g) which was identified (nmr:O-Me O-Me resonance at 3.9 ppm, infrared: C=O stretch at 5.78 microns) as crude 14-hydroxydihydronorcodeinone. A minor contaminant (infrared peak at 5.68 microns) was removed by crystallization from methanol.

EXAMPLE 26
N-Demethylation of 14-Hydroxy-7,8-dihydromorphinone(Oxymorphone)

Preparation of Naloxone (N-Allyl-14-hydroxydihydronormorphinone)

Vinyl chloroformate (15 mmole) was added by syringe to a stirred (room temperature under $N_2$) suspension of 14-hydroxy-7,8-dihydromorphinone (0.90 g, 3.0 mmole) in 7 ml of 1,2-dichloroethane. Then a solution of 1.50 g (7 mmole) 1,8 bis-(dimethylamino)-naphthalene in 5 ml of dichloroethane was similarly added followed by another 4 ml of dichloroethane. The mixture was heated to 65°C over 1.5 hours and then refluxed for another 30 minutes. After cooling the mixture was evaporated in vacuo and the residue taken up in 35 ml of 1:1 $CHCl_3$—$CH_2Cl_2$. This was extracted with 10 ml of 0.5 N HCl, 10 ml of 0.2 HCl, 10 ml of 0.05 N HCl, and 5 ml of 1% $naHCO_3$, then dried and concentrated. The yellow foam thus obtained was dissolved in 40 ml of 1:1 ether-ethyl acetate and extracted twice with 5 ml of 0.1 N HCl, once with 5 ml of water, once with 5 ml of 1% $NaHCO_3$, and again with 5 ml of water. The dried ($Na_2SO_4$) ether-ethyl acetate solution was evaporated at reduced pressure to an amorphous solid (0.70 g) which was identified as N-VOC-O³-VOC-14-hydroxydihydronormorphinone (strong infrared C=O stretch peaks at 5.59, 5.79 and 5.86 microns, C=C-O stretch at 6.05 microns in $CCl_4$; no N-Me resonance but characteristic $CH_2$=CH—O— peaks in nmr in $CDCl_3$).

[The combined aqueous phases from the ether-ethyl acetate extractions were taken to pH 7 with $NaHCO_3$ and extracted with chloroform. Vacuum evaporation of the dried ($Na_2SO_4$) chloroform solution yielded crude O³-VOC-14-hydroxymorphinone as a crystalline residue. Its infrared spectrum ($CH_2Cl_2$) exhibited the two anticipated C=O stretch peaks at 5.60 and 5.77 microns and a $CH_2$=CH—O stretch at 6.05 microns. The characteristic absorption of the $CH_2$=CHO—unit was also found in the nmr ($CDCl_3$) along with the N-Me singlet at 2.42 ppm. A small sample of this material was also converted back to 14-hydroxy-7,8-dihydromorphinone by treatment with $Na_2CO_3$ in aqueous dioxane at reflux.]

Anhydrous HCl was bubbled through a solution of crude N-VOC-O³-VOC-14-hydroxydihydronormorphinone (610 mg) in 15 ml of $CH_2Cl_2$ for 15 minutes and then very slowly for another hour. Volatiles were evaporated in vacuo and the residue was refluxed in anhydrous methanol for 2–3 hours. Reduced pressure concentration of this solution afforded O³-VOC-14-hydroxydihydronormorphinone hydrochloride which was obtained as a crystalline solid which decomposed above 200°C by trituration with hot ether (infrared:- strong C=O stretch peaks at 5.62 and 5.78 microns in chloroform).

A stirred solution of O³-VOC-14-hydroxydihydronormorphinone hydrochloride (272 mg, 0.7 mmole), allyl bromide (121 mg, 1 mmole), and $NaHCO_3$ (134 mg, 1.6 mmole) in 3 ml of absolute methanol was refluxed under $N_2$ for 6 hours, then cooled and filtered. The filtrate was concentrated and then heated at 80°C overnight in a mixture of 10 ml of water and 10 ml of dioxane containing 212 mg of $Na_2CO_3$. The cooled solution (whose pH was lowered to 9 with $CO_2$ gas) was concentrated to 8 – 10 ml and then extracted with three 10 ml portions of chloroform. The pH was further lowered to 7 with dilute $H_2SO_4$ and the solution was again extracted with three 10 ml portions of chloroform. The total chloroform extracts were dried ($Na_2SO_4$), decolorized with 20 mg of Nuchar, and evaporated. The residue was taken up in ethyl acetate-ether, filtered to remove a flocculence, and again concentrated. Pure naloxone ($R_f$ 0.54) was obtained by preparative tlc on silica F 254 with 12:1 chloroform-methanol and crystallized from ethyl acetate-ether, mp 181°–183°C, infrared:strong C=O stretch at 5.82 microns in $CHCl_3$. The strongest peak in the mass spectrum of this product was the parent peak at m/e 327.

In another experiment treatment of 14-hydroxydihydromorphinone with acetic anhydride at 90°C yielded the crude O,O-diacetyl derivative which was reacted with excess vinyl chloroformate and 0.1 equivalents of 1,8-bis-(dimethylamino)-naphthalene in 1,2-dichloroethane, first at room temperature and then at 60°C. The N-VOC-O³-acetyl-14-acetoxydihydronormorphinone obtained therefrom by standard extraction procedures was contaminated by the hydrochloride of the undealkylated diacetyl compound.

What is claimed is:

1. A process for the mono N-dealkylation of tertiary amines selected from the group consisting of N,N-dimethyl-lower alkylamine, N-methyl-di-lower alkylamine, N-methyl-dicyclohexylamine, N,N-dimethylcyclohexylamine, N,N-diethylcyclohexylamine, N,N-dimethylbenzylamine, hordenine, N-methylpyrrolidine, N-ethyl-N-ethylpyrrolidine, nicotine, N-methylpiperidine, piperidine, arecoline, meperidine, tropine, atropine, hyoscyamine, scopolamine, cocaine, tropacocaine, morphine, codeine, O³,O⁶-diacetylmorphine, thebaine, N-methylmorphinans dihydrocodeinones, dihydromorphinones, 6,14-endoethanomorphines, erythromycin and tetracycline, which comprises the steps of replacing the N-alkyl group or one of the N-alkyl groups of said tertiary amine by a vinyloxycarbonyl group by reaction of said tertiary amine with a source of vinyloxycarbonyl groups selected from vinyl haloformates to thereby form a vinyloxycarbonyl amide of the corresponding secondary amine and thereafter cleaving said vinyloxycarbonyl amide under mild acidic conditions with a hydrohalic acid and a hydroxylic reagent selected from the group consisting of water, a lower carboxylic acid and a lower alkanol to split off said vinyloxycarbonyl group from the amino N atom and obtain the corresponding secondary amine or hydrohalide salt thereof.

2. The process of claim 1 wherein said source of vinyloxycarbonyl groups is vinyl chloroformate.

3. The process of claim 1 wherein said reaction of said tertiary amine with said source of vinyloxycarbonyl groups is carried out by combining said tertiary amine with an excess of said source of vinyloxycarbonyl groups in an inert organic solvent maintained at a temperature within the range of from about −40°C to about 0°C, then allowing the mixture to warm to room temperature, and thereafter heating said mixture at reflux for a period ranging from about 30 minutes to about 20 hours to complete formation of said vinyloxycarbonyl amide and/or to facilitate removal of volatile by-products.

4. The process of claim 1 wherein said reaction of said tertiary amine with said source of vinyloxycarbonyl groups is carried out in the presence of a proton scavenger which is more basic than said tertiary amine and less reactive than said tertiary amine toward said source of vinyloxycarbonyl groups so as to effect removal of any acid liberated during said reaction.

5. The process of claim 4 wherein said proton scavenger is selected from the group consisting of 1,8-bis-(dimethylamino)-naphthalene and N-alkyldicyclohexylamines.

6. The process of claim 4 wherein said tertiary amine is in the form of an acid salt thereof.

7. The process of claim 4 wherein at least one of the groups remaining attached to the amino N atom of said tertiary amine throughout the process is a group initially having alcoholic or phenolic hydroxyl group substituents, and the reaction of said tertiary amine with said source of vinyloxycarbonyl groups also forms vinyloxycarbonyl ester groups at the hydroxyl sites.

8. The process of claim 7 wherein subsequent to said splitting off of said vinyloxycarbonyl group from said amino N atom, the resulting secondary amine or hydrohalide salt thereof is modified by attachment of another tertiary amine-forming substituent to said amino N atom, and thereafter said vinyloxycarbonyl ester groups are reconverted to hydroxyl groups by treatment under basic conditions with aqueous of alcoholic base or under strong acidic conditions with aqueous or alcoholic acid.

9. The process of claim 1 wherein said hydrohalic acid is selected from the group consisting of HCl and HBr and the hydroxylic reagent is an alcohol selected from the group consisting of methanol and ethanol.

10. In a process for the N-substituent modification of a tertiary amine selected from the group consisting of N-N-dimethyl-lower alkylamine, N-methyl-di-lower alkylamine, N-methyl-dicyclohexylamine, N,N-dimethylcyclohexylamine, N,N-diethylcyclohexylamine, N,N-dimethylbenzylamine, hordenine, N-methylpyrrolidine, N-ethylpyrrolidine, nicotine, N-methylpiperidine, N-ethylpiperidine, arecoline, meperidine, tropine, atropine, hyoscyamine, scopolamine, cocaine, tropacocaine, morphine, codeine, O³,O⁶-diacetylmorphine, thebaine, N-methylmorphinans, dihydrocodeinones, dihydromorphinones, 6,14-endoethanomorphines, erythromycin and tetracycline, comprising the steps of mono N-dealkylating said tertiary amine to form a secondary amine and thereafter modifying said secondary amine by attachment of another tertiary amine-forming substituent to the amino N atom, the improvement which comprises the steps of effecting said N-dealkylation by replacing the N-alkyl group or one of the N-alkyl groups of said starting tertiary amine by a vinyloxycarbonyl group by reaction of said tertiary amine with a source of vinyloxycarbonyl groups selected from vinyl haloformates to thereby form a vinyloxycarbonyl amide of the secondary amine, and thereafter cleaving said vinyloxycarbonyl amide under mild acidic conditions with a hydrohalic acid and a hydroxylic reagent selected from the group consisting of water, a lower carboxylic acid and a lower alkanol to split off said vinyloxycarbonyl group from the amino N atom and obtain the secondary amine or hydrohalide salt thereof.

11. The process of claim 10 wherein said source of vinyloxycarbonyl groups is vinyl chloroformate.

12. The process of claim 10 wherein at least one of the groups remaining attached to the amino N atom of said starting tertiary amine throughout the process is a group initially having alcoholic and/or phenolic hydroxyl group substituents which are protected by lower alkanoyl or lower alkenoyl protecting groups stable to mild acidic conditions during the splitting off of said vinyloxycarbonyl group from the amino N atom and stable during the attachment of said other tertiary amine-forming substituent to the amino N atom.

13. The process of claim 12 wherein said protecting groups protecting said alcoholic and/or phenolic hydroxyl groups are vinyloxycarbonyl groups.

14. The process of claim 13 wherein said protection of said alcoholic and/or phenolic hydroxyl groups with vinyloxycarbonyl groups and said replacement of the N-alkyl group in said starting tertiary amine by a vinyloxycarbonyl group are simultaneously effected by treatment of said starting tertiary amine containing free alcoholic and/or phenolic hydroxyl groups with an excess of vinyl chloroformate and a proton scavenger in an insert solvent, said proton scavenger being more basic than said starting tertiary amine and less reactive than said starting tertiary amine toward said vinyl chloroformate so as to effect removal of any acid liberated during the resulting reaction.

15. The process of claim 14 wherein said proton scavenger is selected from the group consisting of 1,8-bis-(dimethylamino)-naphthalene and N-alkyldicyclohexylamines.

16. The process of claim 13 wherein subsequent to attachment of said other tertiary amine-forming substituent to the amino N atom, said vinyloxycarbonyl groups protecting said alcoholic and/or phenolic hydroxyl groups are replaced by hydrogen to give the free alcoholic and/or phenolic hydroxyl groups by treatment under basic conditions with aqueous or alcoholic base or under strong acidic conditions with aqueous or alcholic acid.

17. A process for the synthesis of nalorphine from morphine which comprises the stepps of reacting morphine with vinyl chloroformate in the presence of a proton scavenger which is more basic than said morphine and less reactive than said morphine toward said vinyl chloroformate so as to effect removal of any acid liberated during said reaction and to obtain N,O,O-tri(vinyloxycarbonyl)-normorphine, treating said N,O,-O-tri(vinyloxycarbonyl)-normorphine under mild acidic conditions with a hydrobolic acid and a hydroxylic reagent selected from the group consisting of water, a lower carboxylic acid and a lower alkanol to split off the vinyloxycarbonyl group froom the amino N atom and obtain the hydrohalide salt of O,O-di(vinyloxycarbonyl)-normorphine, neutralizing said hydrohalide salt and N-allylating the neutralized product by reaction with an allyl halide to obtain O,O-di(vinyloxycarbonyl)-nalorphine, and treating said O,-O-di(vinyloxycarbonyl)-nalorphine under basic conditions with aqueous or alcoholic base or under strong acidic conditions with aqueous or alcoholic acid to obtain nalorphine.

18. A process for the synthesis of naloxone from oxymorphone which comprises the steps of reacting oxymorphone with vinyl chloroformate in the presence of a proton scavenger which is more basic than said oxymorphone and less reactive than said oxymorphone toward said vinyl chloroformate so as to effect removal of any acid liberated during said reaction and to obtain N-vinyloxycarbonyl-$O^3$-vinyloxycarbonyl-14-hydroxydihydronormorphinone, treating said N-vinyloxycarbonyl-$O^3$-vinyloxycarbonyl-14-hydroxydihydronormorphinone under mild acidic conditions with a hydrohalic acid and a hydroxylic reagent selected from the group consisting of water, a lower carboxylic acid and a lower alkanol to split off the vinyloxycarbonyl group from the amino N atom and obtain the hydrohalide salt of $O^3$-vinyloxycarbonyl-14-hydroxydihydronormorphinone, neutralizing said hydrohalide salt and N-allylating the neutralized product by reaction with an allyl halide to obtain $O^3$-vinyloxycarbonyl-naloxone, and treating said $O^3$-vinyloxycarbonyl-naloxone with aqueous or alcoholic base to obtain naloxone.

* * * * *